(12) United States Patent
Havens et al.

(10) Patent No.: US 10,480,914 B2
(45) Date of Patent: *Nov. 19, 2019

(54) BIODEGRADABLE SHOTGUN WAD SYSTEM

(71) Applicant: College of William & Mary, Williamsburg, VA (US)

(72) Inventors: Kirk J. Havens, Plainview, VA (US); David M. Stanhope, Williamsburg, VA (US); Kory T. Angstadt, Gloucester, VA (US); Jason P. McDevitt, Williamsburg, VA (US)

(73) Assignee: College of William & Mary, Williamsburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/163,867

(22) Filed: Oct. 18, 2018

(65) Prior Publication Data
US 2019/0093998 A1    Mar. 28, 2019

Related U.S. Application Data

(63) Continuation of application No. 15/926,523, filed on Mar. 20, 2018, now Pat. No. 10,139,206.
(Continued)

(51) Int. Cl.
*F42B 7/08* (2006.01)
*F42B 33/12* (2006.01)
(Continued)

(52) U.S. Cl.
CPC .............. *F42B 7/08* (2013.01); *C08J 5/00* (2013.01); *C08L 67/02* (2013.01); *C08L 67/04* (2013.01);
(Continued)

(58) Field of Classification Search
CPC .. F42B 7/08; C08L 67/02; C08L 67/04; C08L 2205/02; C08L 2201/06; C08J 5/00;
(Continued)

(56) References Cited

U.S. PATENT DOCUMENTS

| | | | |
|---|---|---|---|
| 2,582,124 A | | 1/1952 | Holmes |
| 3,074,344 A | * | 1/1963 | Devaux ..................... F42B 7/08 102/454 |

(Continued)

FOREIGN PATENT DOCUMENTS

| | | |
|---|---|---|
| FR | 3010410 | 3/2015 |
| GB | 2367606 | 4/2002 |

(Continued)

OTHER PUBLICATIONS

Schwier, Chris, "Polyhydroxyalcanoates (PHA) Bioplastic Packaging Materials", Metabolix, Inc. (Year: 2010).*
(Continued)

*Primary Examiner* — Joshua T Semick
(74) *Attorney, Agent, or Firm* — Knobbe, Martens, Olson & Bear, LLP

(57) ABSTRACT

Herein we describe embodiments of shotgun shells, methods for loading such shotgun shells, and methods for using them. In some embodiments, the shotgun shells utilize a multi-component wad system with a biodegradable powder wad that stays intact through the firing process, and a separate and chemically distinct biodegradable shot wad that breaks apart within one meter after being shot out of the barrel of a shotgun. A clean release of the shot can be obtained, providing both high performance and biodegradability. The biodegradable shot wad can be a biodegradable polyester.

20 Claims, 11 Drawing Sheets

Related U.S. Application Data

(60) Provisional application No. 62/474,152, filed on Mar. 21, 2017, provisional application No. 62/474,157, filed on Mar. 21, 2017.

(51) Int. Cl.
  *C08J 5/00* (2006.01)
  *F42B 33/02* (2006.01)
  *C08L 67/02* (2006.01)
  *C08L 67/04* (2006.01)

(52) U.S. Cl.
  CPC .............. *F42B 33/02* (2013.01); *F42B 33/12* (2013.01); *C08J 2300/16* (2013.01); *C08J 2323/06* (2013.01); *C08J 2367/02* (2013.01); *C08J 2367/04* (2013.01); *C08L 2201/06* (2013.01); *C08L 2205/02* (2013.01)

(58) Field of Classification Search
  CPC .............. C08J 2300/16; C08J 2367/02; C08J 2367/04; C08J 2323/06
  See application file for complete search history.

(56) References Cited

U.S. PATENT DOCUMENTS

| | | | |
|---|---|---|---|
| 3,093,073 A | 6/1963 | Lockwood et al. | |
| 3,402,664 A | 9/1968 | Cramer | |
| 3,713,388 A * | 1/1973 | Pontoriero | F42B 7/02 102/436 |
| 3,724,376 A * | 4/1973 | Kordas | F42B 7/06 102/432 |
| 3,974,770 A | 8/1976 | Clark | |
| 4,004,522 A | 1/1977 | Furniss et al. | |
| 4,190,476 A * | 2/1980 | Flatau | F42B 12/50 156/218 |
| 5,138,950 A * | 8/1992 | Gardner | F42B 7/12 102/456 |
| 5,263,417 A | 11/1993 | Godfrey-Phllips | |
| 5,859,090 A | 1/1999 | Shahid et al. | |
| 5,979,330 A * | 11/1999 | Cornell | F42B 7/08 102/449 |
| 6,283,037 B1 | 9/2001 | Sclafani | |
| 7,810,432 B2 | 10/2010 | Stevens | |
| 8,418,620 B2 | 4/2013 | Frank | |
| 9,222,761 B2 | 12/2015 | DeJong | |
| 9,250,048 B2 * | 2/2016 | Meyer | F42B 7/08 |
| 9,528,800 B2 * | 12/2016 | Havens | F42B 7/08 |
| 10,139,206 B2 * | 11/2018 | Havens | C08L 67/02 |
| 2004/0099172 A1 | 5/2004 | Schikora | |
| 2008/0223245 A1 | 9/2008 | Stevens et al. | |
| 2012/0144722 A1 | 6/2012 | Havens et al. | |
| 2014/0366765 A1 | 12/2014 | Havens et al. | |
| 2016/0010963 A1 | 1/2016 | Moreno | |
| 2016/0216067 A1 | 7/2016 | Jackson | |
| 2016/0334197 A1 | 11/2016 | Pedretti | |
| 2017/0160062 A1 | 6/2017 | Havens et al. | |
| 2018/0274889 A1 | 9/2018 | Havens et al. | |
| 2018/0274890 A1 | 9/2018 | Havens et al. | |

FOREIGN PATENT DOCUMENTS

| | | |
|---|---|---|
| GB | 2496180 | 5/2013 |
| WO | WO 2014/201278 | 12/2014 |
| WO | WO 2015/033081 | 3/2015 |
| WO | WO 2016/174276 | 11/2016 |

OTHER PUBLICATIONS

Search Report and Written Opinion for application No. PCT/US14/42169 dated Dec. 19, 2004.

Search Report and Written Opinion for application No. PCT/US18/23429 dated Jun. 8, 2018.

Search Report and Written Opinion for application No. PCT/US18/23402 dated Jun. 11, 2018.

Machine translation of FR 3010410 A1, Mar. 2015 provided by Examiner.

* cited by examiner

BIODEGRADABLE SHOTGUN WAD SYSTEM

CROSS-REFERENCE TO RELATED APPLICATIONS

The present application is a continuation of U.S. patent application Ser. No. 15/926,523, filed Mar. 20, 2018, which claims priority under 35 U.S.C. § 119(e) to (i) U.S. Provisional Patent Application No. 62/474,152, filed Mar. 21, 2017, and (ii) U.S. Provisional Patent Application No. 62/474,157, filed Mar. 21, 2017. The entire disclosure of each of these applications is incorporated by reference herein.

STATEMENT REGARDING FEDERALLY SPONSORED RESEARCH OR DEVELOPMENT

Not Applicable

BACKGROUND

Field

The field relates to biodegradable wads associated with shotgun shells often used in and around aquatic environments.

Description of the Related Art

Shotguns are one of the most widely produced firearms worldwide. For example, the number of new shotguns manufactured in the United States was close to one million in 2011. Moreover, the annual production of shotgun shells is in the billions. Almost every shotgun shell that is fired discharges a wad (i.e., a "spent" wad) at a substantial distance from the sportsman. This distance prevents facile recovery, and the spent wad subsequently becomes pollution. Typically, and especially when lead shot is not used, the wad is composed of plastic that does not biodegrade, meaning the pollution is persistent in the environment.

The wads have multiple purposes in shotgun ammunition: (1) they separate the powder from the shot; (2) they expand to form a gas seal that retains the gas blast behind the shot as it travels down the barrel, efficiently maintaining velocity; (3) they provide protection to the barrel (particularly important when non-lead shot is used); (4) they can provide a cushioning effect to soften recoil; and (5) they can provide improved shot patterns and minimize distortion of the shot.

The effect of non-biodegradable plastic debris is significant. Abandoned shotgun wads can present safety, nuisance, and environmental problems on land and in freshwater, estuarine, and marine waters. When a waterfowl hunter fires a shotgun armed with a shell containing a non-biodegradable plastic wad, the wad is shot out of the gun and often flies into the adjoining water. The quantity of abandoned shotgun wads in the nation's waters is unknown; however, a shotgun wad is discharged with every shot fired, and many are abandoned. Target shooters (e.g., skeet, trap) often fire many shots in rapid succession, leaving a slew of plastic wads. Due to the range of shotguns and the locations in which they are fired, there is often no easy way for sportsmen to recover each spent shotgun wad.

Abandoned wads enter the food chain as non-biodegradable plastic debris. Plastic wads are reported as one of the most common debris items collected during beach cleanups (NOAA. 2012. Guidebook to community beach cleanups). The buoyancy of many plastics causes the debris to float; therefore, plastic wads that do not wash ashore tend to float on the water's surface. The floating wads can be mistaken for food by waterfowl and other marine species. For example, wads have been found in the stomach contents of ocean-foraging birds including the albatross (The Conservation Report. 2009). The consumption of plastic can lead to reduced fitness of aquatic species.

Abandoned wads also damage sensitive habitats. Over time, non-degradable plastic wads can break apart, causing massive amounts of non-degradable microplastics to enter the aquatic ecosystem. Currents can deposit the floating wads on distant river banks and coasts, thereby impacting all marine habitats, even habitats where hunting is prohibited. Furthermore, non-degradable plastic components can remain largely intact even after spending years afloat, before fracturing into smaller microplastics. The microplastics can adsorb organic toxins, and do not readily break down into compounds that can be assimilated into the natural carbon cycle.

Due in part to their low cost and versatility, production of plastics is likely to continue to increase. Worldwide commodity plastic production has increased by roughly 9% annually since 1950, with over 300 million tons produced annually in 2016. Approximately 60% of all the plastic ever made is accumulating in landfills and the natural environment (Geyer, R, et al., "Production, use, and fate of all plastics ever made", Science Advances, 19 Jul. 2017, Vol. 3 (7): e1700782). It is likely that the increase in plastic production mirrors the increase in aquatic debris. Additionally, around half the global population resides within 100 kilometers of a coastline. With coastal populations increasing, the amount of aquatic and land-based plastic debris is likely to rise.

SUMMARY

The present disclosure relates to shotgun wads, and methods for their use, utilizing a wad system comprising at least two distinct and separate wads, both of which comprise one or more biodegradable polymers, wherein one of the two distinct wads comprises a powder wad that is tough and stays intact throughout the firing process and flight, and the second of the two distinct wads comprises a shot wad that is relatively brittle and breaks into multiple fragmented and independent pieces upon exiting the barrel after a shot. In some embodiments, the shot wad breaks apart within one meter of exiting the barrel.

The shot wad contains the shot and provides a barrier between the shot and the hull. It can take the form of a shot cup, a shot pipe wad, or any other shot wad.

The powder wad (also referred to as a gas seal or gas sealing wad or over-powder wad) separates the shot from the powder, and provides a gas sealing component. The quality of the gas sealing capability can vary based on the formulation and shape of the powder wad. The powder wad and the shot wad can each comprise one or more biodegradable polymers, and the biodegradable polymers can be the same polymer or a different polymer.

Additional wads can be used, including but not limited to one or more of a cushion wad, spacer wad, and overshot wad.

Particular advantages of this wad system in a shotgun shell can include, but are not limited to advantages related to the biodegradable powder wad: (i) by staying intact, the powder wad can perform the gas sealing function of gas seals of commercially available ammunition; (ii) by staying intact, the powder wad can perform as well as, and in some cases, better than commercial ammunition; and (iii) by staying intact during flight but eventually fragmenting or eroding during degradation, the powder wad can adhere to one or more standards for biodegradable without impacting performance.

Particular advantages of this wad system in a shotgun shell can include, but are not limited to advantages related to the biodegradable shot wad: (i) by breaking apart into multiple pieces, the biodegradable shot wad is less visually unappealing when abandoned in the environment, as it is less obvious to the naked eye; (ii) by breaking apart into multiple pieces, increased surface area of the biodegradable shot wad is exposed, which tends to increase the rate of biodegradation; (iii) by breaking apart into multiple pieces, the biodegradable shot wad can be less likely to cause injuries if ingested by an animal; and (iv) by breaking apart into multiple pieces, the biodegradable shot wad provides a cleaner release of the shot than typical prior art plastic wads, all the while the powder wad stays intact and efficiently contains the expanding gases to propel the shot.

In some embodiments, the biodegradable shot wad utilizes a "shot pipe" wad design with two open ends. The biodegradable shot pipe wad, by virtue of not having a base, allows slightly more room in the crowded hull for additional powder or shot. This is particularly advantageous when used in conjunction with steel shot, which is not as dense as lead. Hunters typically use larger shot when hunting with steel relative to lead, meaning space is at a premium in the load. In some embodiments, the biodegradable shot wad utilizes a cup design in which at least one end is enclosed or partially enclosed. The design can include one open end.

In some embodiments, the shot wad is neither a shot pipe wad or a shot cup wad. For example, a modified shot pipe wad could be used in which one end contains a thin strip of plastic that can direct the fragmentation pattern when the shot wad breaks apart, which can influence the shot pattern.

In some embodiments, the key is the use of a tough biodegradable polymer formulation for the powder wad such that the powder wad stays intact during firing, flight and/or landing, and the use of a somewhat brittle biodegradable polymer formulation in the shot wad such that the shot wad breaks apart shortly after firing when fired at typical operating speed and pressure (e.g., between 8,000 psi and 11,500 psi for 12 gauge, 3" ammunition for shotgun ammunition). The shot wad may begin to fracture while still within the barrel, but it does not break apart until leaving the barrel. Instead, the shot wad breaks apart within a short distance of leaving the barrel. In some embodiments, the shot wad breaks apart within one meter of leaving the barrel, but other distances are contemplated, e.g., within 1 foot, within 2 feet, within 3 feet, within 10 feet, within 20 feet, etc. As used herein, "break apart" means a wad fragments such that pieces are displaced in a manner wherein previously contiguous pieces become physically separated. In some embodiments, the shot wad of the present invention can have fracture lines similar to those in an intact puzzle while the shot wad is still inside the barrel, during which time the shot wad remains functionally intact, and the barrel remains protected from the shot, until the shot wad leaves the barrel, when the shot wad breaks apart.

The brittle plastic formulations utilized in the shot wad would not be acceptable for molding into and use as a powder wad, as the resulting powder wad would likely fragment and thus not perform the requisite gas sealing function very well. In some embodiments, the shot wad and the powder wad utilize different biodegradable polymers. In some embodiments, the powder wad comprises a biodegradable polymer designed to stay intact during firing due, in part to, its material properties. In some embodiments, the selection of the biodegradable polymer and the design of the powder wad facilitate the powder wad staying intact. In some embodiments, the shot wad comprises a biodegradable polymer designed to fragment after firing due, in part to, its material properties. In some embodiments, the selection of the biodegradable polymer and the design of the shot wad facilitate fragmentation.

It is noted that when the biodegradable shot wad is combined with a properly functioning powder wad, the biodegradable shot wad experiences less impact force upon firing than does the powder wad, as well as a different relative directional component of that force, and thus can stay functionally intact until exiting the gun.

Analogously, when utilizing shot wad designs that lack pre-slit sections (petals) designed to fold back, the tough formulations used for the powder wad would provide worse targeting performance if those same tough formulations were used to produce the shot wad. If the shot wads used herein did not break apart soon after leaving the barrel, then shot patterns would be adversely impacted. For this reason, conventionally formulated plastic shotgun wads which remain intact after firing do not have the advantages described herein. The shot wads described herein generally lack petals that bend back to release shot, although such designs with petals are contemplated.

The biodegradable shot wads described herein break apart shortly after leaving the barrel. In some embodiments, the biodegradable shot wads break apart within one meter of leaving the barrel, but other metrics of distance are contemplated. In some embodiments, the biodegradable shot wads fragment when shot at an initial velocity exiting the barrel at 1,000 feet per second. It is noted that the shot wad and the average shot pellet are traveling at approximately the same speed upon first exiting the barrel. The distance at which the biodegradable shot wads break apart after leaving the barrel, and the pattern of the break or fragment, can be controlled, at least in part, by the design of the shot wad and the biodegradable polymer formulation that is utilized.

When the biodegradable shot wad breaks apart after leaving the barrel, the shot pellets are gently released from the clutches of the shot wad and continue towards the target. Conventional shot cup wads reproducibly release shot, but the shot can be subjected to small additional forces that result in a less clean release of the shot, and inferior patterns relative to the biodegradable wad system described herein.

The biodegradable powder wads used herein can include any biodegradable polymer material that can withstand the impact force of firing and perform the functions of a powder wad including the gas sealing function. For example, formulations of biodegradable polymers comprising a polyhydroxyalkanoate polymer (PHA), polybutylene succinate (PBS), poly(butylene succinate-co-adipate) (PBSA), a polybutylene succinate copolymer other than PBSA (PBS(c)), and combinations thereof, can perform this function. Other biodegradable polymers, including polylactic acid (PLA) and polycaprolactone (PCL), can also be used, especially if used in combination with other polymers. Other polymers, including oxo-biodegradable polyethylene and other polymer compositions, can also be used. In some embodiments, biodegradability can be defined according to compliance with international standards. Other non-plastic biodegradable polymers can also be used as the powder wad, including cork, fiber, wool felt, and cellulosic products such as paperboard. In general, these materials do not provide as good gas sealing properties as some of the plastic-based powder wads, but notwithstanding the slight inefficiency, they can perform adequately depending on a variety of factors. Coating such materials with a wax composition, for example beeswax, can improve performance.

The powder wad described herein comprises any biodegradable polymer described herein. The powder wad can comply with one or more definitions of biodegradable. The ASTM D6400 is entitled Standard Specification for Labeling of Plastics Designed to be Aerobically Composted in Municipal or Industrial Facilities. See ASTM Standard D6400, 2004, "Standard Specification for Compostable Plastics," ASTM International, West Conshohocken, Pa., 2004, DOI: 10.1520/D6400-04, www.astm.org, wherein the ASTM Standard D6400, 2004 is incorporated by reference in its entirety. The ASTM D6400 identifies three governing provisions that must be met: the product must physically degrade such that the product is not "readily distinguishable" from the surrounding compost, the product must be consumed by microorganisms at a rate comparable to other known compostable materials, and the product cannot adversely impact the ability of the compost to support plants. This specification covers plastics and products made from plastics that are designed to be composted in municipal and industrial aerobic composting facilities.

In some embodiments, a material is biodegradable if it undergoes degradation by biological processes during composting to yield $CO_2$, water, inorganic compounds, and biomass at a rate consistent with other known compostable materials. In some embodiments, a material is biodegradable if it leaves no visible, distinguishable, or toxic residue. Bioplastics can be defined by where the material comes from or its origin. Bioplastics can be plant-derived such as from corn, sugar, or starch, compared to traditional plastics that are typically petroleum-based. Bioplastics can be defined by a time frame of degradation, wherein bioplastics degrade significantly faster than the rate of traditional plastics. Biodegradation can be defined by a change of material or degradation by naturally occurring microorganisms over a period of time. Degradation can be defined by a deleterious change in the chemical structure, physical properties, or appearance of the material. See ASTM D6400, 2004. A biodegradable material can be defined by the ability to completely break down and return to nature, i.e., decompose into elements found in nature within a reasonably short period of time such as one year after customary disposal. A biodegradable material can be defined as a material wherein all the organic carbon can be converted into biomass, water, carbon dioxide, and/or methane via the action of naturally occurring microorganisms such as bacteria and fungi, in timeframes consistent with the ambient conditions of the disposal method. See ASTM D883. The powder wad can be described as bio-based, biodegradable, or compostable.

The powder wad described herein can comprise PBSA, and can comprise by weight at least 10% PBSA, at least 20%, at least 30%, at least 40%, at least 50%, at least 60%, at least 70%, at least 80%, at least 90%, or at least 95% PBSA, or ranges incorporating any of the foregoing values. In embodiments in which the powder wad comprises PBSA, it is preferable when the gas seal wad comprises at least 60% by weight PBSA. In some embodiments, other biodegradable polymers are also incorporated into the shotgun gas seal wads. For example, PHA can be included.

The powder wad described herein can comprise PBS, and can comprise by weight at least 10% PBS, at least 20%, at least 30%, at least 40%, at least 50%, at least 60%, at least 70%, at least 80%, at least 90%, or at least 95% PBS, or ranges incorporating any of the foregoing values. In preferred embodiments in which the powder wad comprises PBS, it is preferable when the powder wad comprises at least 60% by weight PBS. In some embodiments, other biodegradable polymers are also incorporated into the shotgun gas seal wads. For example, PHA can be included.

The powder wad described herein can comprise PBS(c), and can comprise by weight at least 10% PBS(c), at least 20%, at least 30%, at least 40%, at least 50%, at least 60%, at least 70%, at least 80%, at least 90%, or at least 95% PBS(c), or ranges incorporating any of the foregoing values. In preferred embodiments in which the powder wad comprises PBS(c), it is preferable when the powder wad comprises at least 60% by weight PBS(c). In some embodiments, other biodegradable polymers are also incorporated into the shotgun gas seal wads. For example, PHA can be included.

The powder wad described herein can comprise PLA, and can comprise by weight at least 10% PLA, at least 20%, at least 30%, at least 40%, at least 50%, at least 60%, at least 70%, at least 80%, at least 90%, or at least 95% PLA, or ranges incorporating any of the foregoing values. In some embodiments, other biodegradable polymers are also incorporated into the shotgun gas seal wads. For example, PHA can be included.

The powder wad described herein can comprise PCL, and can comprise by weight at least 10% PCL, at least 20%, at least 30%, at least 40%, at least 50%, at least 60%, at least 70%, at least 80%, at least 90%, or at least 95% PCL, or ranges incorporating any of the foregoing values. In some embodiments, other biodegradable polymers are also incorporated into the shotgun gas seal wads. For example, PHA can be included.

Blends of certain biodegradable polymers with a relatively small amount (0.1-25%) of PHA may be beneficial in facilitating the rate of biodegradation in marine environments relative to powder wads that contain no PHA. In some embodiments of such blends, the weight fraction of the first biodegradable polymer, such as PBSA, PBS, and PBS(c), as a percentage of the total biodegradable polymer composition is greater than about 50% (e.g., greater than 60%, greater than 70%, greater than 80%, greater than 90%, or ranges incorporating any of the foregoing values). In some embodiments, the weight ratio of PBSA, PBS, PBS(c) to PHA is greater than 4:1 (e.g., greater than 5:1, greater than 6:1, greater than 7:1, greater than 8:1, greater than 9:1, greater than 10:1, greater than 11:1, greater than 12:1, greater than 13:1, greater than 14:1, or greater than 15:1, or ranges incorporating any of the foregoing values). In some embodiments, the processability of blends with higher concentrations of PHA tends to be poor, and additives that enhance the processability of said blends can increase persistence or toxicity of the resulting wads in the environment.

The powder wad described herein can comprise PHA, and can comprise by weight at least 10% PHA, at least 20%, at least 30%, at least 40%, at least 50%, at least 60%, at least 70%, at least 80%, at least 90%, or at least 95% PHA. In some embodiments, more than one different type of PHA is used. In some embodiments, other biodegradable polymers are also incorporated into the shotgun gas seal wads.

In contrast, the biodegradable shot wad described herein comprises a biodegradable formulation that is designed to fragment. In some embodiments, the biodegradable shot wad is not tough enough to withstand the forces of the firing process. Suitable compositions comprise one or biodegradable plastics, and preferably comprise a biodegradable polyester. In some embodiments, suitable compositions comprise one or more biodegradable polyesters selected from the group consisting of PHA, PBS, PBSA, PCL, PLA, and combinations thereof. Preferably, the biodegradable plastic formulation used to make the shot wad has a specific gravity greater than 1.0, and more preferably, greater than 1.1, such that wad fragments that enter aquatic environments will tend to sink. Certain biodegradable polymers have a specific gravity greater than 1.0, causing its tendency to sink. In some embodiments, the biodegradable polymer of the shot wad has a specific gravity greater than the ambient aquatic environment. The specific gravity of one or more wads of the wad system in g/cm3 can be greater than water, greater than one, greater than saltwater, greater than 1.025, greater than 1.1, greater than 1.2, greater than 1.3, greater than 1.4, between 1 and 1.45, or between 1.2 and 1.45, or ranges incorporating any of the foregoing values.

The shot wad described herein can comprise PBSA, and can comprise by weight at least 10% PBSA, at least 20%, at least 30%, at least 40%, at least 50%, at least 60%, at least 70%, at least 80%, at least 90%, or at least 95% PBSA, or ranges incorporating any of the foregoing values. In some embodiments, other biodegradable polymers are also incorporated into the shot wad. For example, PHA can be included.

The shot wad described herein can comprise PBS, and can comprise by weight at least 10% PBS, at least 20%, at least 30%, at least 40%, at least 50%, at least 60%, at least 70%, at least 80%, at least 90%, or at least 95% PBS, or ranges incorporating any of the foregoing values. In some embodiments, other biodegradable polymers are also incorporated into the shot wad. For example, PHA can be included.

The shot wad described herein can comprise PBS(c), and can comprise by weight at least 10% PBS(c), at least 20%, at least 30%, at least 40%, at least 50%, at least 60%, at least 70%, at least 80%, at least 90%, or at least 95% PBS(c), or ranges incorporating any of the foregoing values. In some embodiments, other biodegradable polymers are also incorporated into the shot wad. For example, PHA can be included.

The shot wad described herein can comprise PLA, and can comprise by weight at least 10% PLA, at least 20%, at least 30%, at least 40%, at least 50%, at least 60%, at least 70%, at least 80%, at least 90%, or at least 95% PLA, or ranges incorporating any of the foregoing values. In some embodiments, other biodegradable polymers are also incorporated into the shot wad. For example, PHA can be included.

The shot wad described herein can comprise PCL, and can comprise by weight at least 10% PCL, at least 20%, at least 30%, at least 40%, at least 50%, at least 60%, at least 70%, at least 80%, at least 90%, or at least 95% PCL, or ranges incorporating any of the foregoing values. In some embodiments, other biodegradable polymers are also incorporated into the shot wad. For example, PHA can be included.

The shot wad described herein can comprise PHA, and can comprise by weight at least 10% PHA, at least 20%, at least 30%, at least 40%, at least 50%, at least 60%, at least 70%, at least 80%, at least 90%, or at least 95% PHA, or ranges incorporating any of the foregoing values. In some embodiments, other biodegradable polymers are also incorporated into the shot wad.

In addition to one or more biodegradable polymers, the powder wad and the shot wad can comprise additives, including lubricants, mold release agents, impact modifiers, pigments or other colorants, other polymeric components, photodegradation enhancers, stabilizers, plasticizers, and other plastic additives. Environmentally toxic plastic additives should be avoided.

In preferred embodiments, the biodegradable wads biodegrade reasonably well in most environments in which the wads might ultimately end up, including wastewater treatment facilities, soil, freshwater environments, estuarine environments, and marine environments.

In some embodiments, a shotgun shell is provided. The shotgun shell can include a shotgun case having a boundary defining an enclosed space, a powder wad, and a biodegradable shot wad confined within the enclosed space and having the properties described above. Additional components of the shotgun shell include the hull, primer, powder, shot, and supplemental wads if needed.

In some embodiments, a method of shooting a shotgun shell is provided. The method can include the step of providing a shotgun case having a boundary defining an enclosed space, a biodegradable powder wad comprising a biodegradable polymer, and a biodegradable shot wad comprising a biodegradable plastic confined within the enclosed space. The method can include the step of inserting the shotgun shell into a shotgun. The method can include the step of firing the shotgun. The wads exit the barrel of the shotgun upon firing. The method can include the step of exposing the biodegradable shot wad and the biodegradable powder wad to a land or aquatic environment after having been fired from the shotgun.

In some embodiments, a method of loading a shotgun shell is provided. The method includes the steps of providing a primed shotshell hull, sequentially adding powder, a biodegradable powder wad, a biodegradable shot wad, and shot to said hull, and then crimping the loaded hull, wherein the biodegradable powder wad stays intact after firing, and wherein the biodegradable shot wad breaks apart after firing within one meter of exiting the shotgun barrel at a velocity exceeding 1,000 feet per second.

In some embodiments, a shotgun shell is provided. The shotgun shell can include a shotgun case having a boundary defining an enclosed space. The shotgun shell can include powder. The shotgun shell can include shot. The shotgun shell can include a biodegradable powder wad configured to be confined within said boundary. The shotgun shell can include a biodegradable shot wad configured to be confined within said boundary. In some embodiments, said biodegradable shot wad at least partially surrounds said shot in the shotgun case. In some embodiments, said biodegradable shot wad comprises a biodegradable material. In some embodiments, said biodegradable powder wad physically separates said powder from said shot. In some embodiments, said biodegradable powder wad comprises a biodegradable material. In some embodiments, said biodegradable powder wad is physically and chemically distinct from said biodegradable shot wad. In some embodiments, upon firing of said shotgun shell from a shotgun having a barrel, said biodegradable powder wad is configured to stay intact during flight and landing and said biodegradable shot wad is configured to break apart into multiple discrete pieces during flight or landing.

In some embodiments, said biodegradable powder wad comprises a biodegradable polymer that satisfies the ASTM D6400 standard (2004). In some embodiments, said biodegradable shot wad comprises a biodegradable polyester. In some embodiments, said biodegradable powder wad comprises a biodegradable polyester. In some embodiments, upon firing of said shotgun shell from a shotgun having a barrel such that said shot exits said barrel at a velocity exceeding 1,000 feet per second, said biodegradable powder wad stays intact and does not break apart within one meter of exit from said barrel. In some embodiments, upon firing of said shotgun shell from a shotgun having a barrel such that said shot exits said barrel at a velocity exceeding 1,000 feet per second, said biodegradable shot wad breaks apart into multiple discrete pieces within one meter of exit from said barrel. In some embodiments, said biodegradable powder wad comprises a biodegradable polymer selected from the group consisting of PHA, PLA, PCL, PBS, PBSA, and PBS(c). In some embodiments, said biodegradable powder wad comprises a biodegradable material selected from the group consisting of wool felt, cork, fiber, and paperboard. In some embodiments, said biodegradable powder wad comprises oxo-biodegradable polyethylene. In some embodiments, said biodegradable shot wad comprises a biodegradable polymer selected from the group consisting of PHA, PLA, PCL, PBS, and PBSA. In some embodiments, said biodegradable shot wad comprises PHA. In some embodiments, said biodegradable shot wad has a specific gravity greater than 1.1. In some embodiments, said biodegradable shot wad is a biodegradable shot pipe wad comprising a generally cylindrical wad that has two open ends. In some embodiments, said biodegradable shot wad is a cup-style wad with one open end and one closed end, wherein said one closed end is positioned adjacent to the powder wad. In some embodiments, said shotgun shell provides superior shot patterning when fired than occurs in an otherwise identical shell wherein the chemical composition of the biodegradable shot wad is the same as the biodegradable powder wad.

In some embodiments, a method of shooting a shotgun shell is provided. The method can include providing a shotgun shell having a boundary defining an enclosed space and powder, shot, a biodegradable powder wad, and a biodegradable shot wad confined within said enclosed space. In some embodiments, said biodegradable shot wad surrounds said shot within said enclosed space within said shotgun shell. In some embodiments, said biodegradable powder wad physically separates said powder from said shot. The method can include providing a shotgun having a barrel. The method can include loading said shotgun shell into said shotgun. The method can include firing the shotgun, whereby the shot, the biodegradable powder wad and the biodegradable shot wad are launched out of said barrel to expose said biodegradable shot wad and said biodegradable powder wad to a terrestrial or aquatic environment. In some embodiments, said biodegradable wads biodegrade. In some embodiments, said biodegradable shot wad comprises a biodegradable material. In some embodiments, said biodegradable powder wad comprises a biodegradable material. In some embodiments, said biodegradable powder wad is physically and chemically distinct from said biodegradable shot wad. In some embodiments, upon firing of said shotgun shell from the shotgun, said biodegradable powder wad stays intact and does not break apart during flight or landing, and said biodegradable shot wad breaks apart into multiple discrete pieces during flight or landing.

In some embodiments, said biodegradable powder wad comprises a biodegradable polymer that satisfies the ASTM D6400 standard (2004). In some embodiments, said biodegradable shot wad comprises a biodegradable polyester. In some embodiments, said biodegradable powder wad comprises a biodegradable polyester. In some embodiments, upon firing of said shotgun shell from a shotgun having a barrel such that said shot exits said barrel at a velocity exceeding 1,000 feet per second, said biodegradable powder wad stays intact and does not break apart within one meter of exit from said barrel. In some embodiments, upon firing of said shotgun shell from a shotgun having a barrel such that said shot exits said barrel at a velocity exceeding 1,000 feet per second, said biodegradable shot wad breaks apart into multiple discrete pieces within one meter of exit from said barrel. In some embodiments, said biodegradable powder wad comprises a biodegradable polymer selected from the group consisting of PHA, PLA, PCL, PBS, PBSA, and PBS(c). In some embodiments, said biodegradable powder wad comprises a biodegradable material selected from the group consisting of wool felt, cork, fiber, and paperboard. In some embodiments, said biodegradable powder wad comprises oxo-biodegradable polyethylene. In some embodiments, said biodegradable shot wad comprises a biodegradable polymer selected from the group consisting of PHA, PLA, PCL, PBS, and PBSA. In some embodiments, said biodegradable shot wad comprises PHA. In some embodiments, said biodegradable shot wad has a specific gravity greater than 1.1. In some embodiments, said biodegradable shot wad is a biodegradable shot pipe wad comprising a generally cylindrical wad that has two open ends. In some embodiments, said biodegradable shot wad is a cup-style wad with one open end and one closed end, wherein said one closed end is positioned adjacent to the powder wad within said shell. In some embodiments, said shotgun shell provides superior shot patterning when fired than occurs in an otherwise identical shell wherein the chemical composition of the biodegradable shot wad is the same as the biodegradable powder wad.

In some embodiments, a method of loading a shotgun shell is provided. The method can include providing a shotshell hull. The method can include providing powder. The method can include providing shot. The method can include providing a biodegradable powder wad. The method can include providing a biodegradable shot wad. The method can include loading said powder, said biodegradable powder wad, said biodegradable shot wad, and said shot into said shotgun hull. The method can include crimping said shotgun hull loaded with said powder, said biodegradable powder wad, said biodegradable shot wad, and said shot. In some embodiments, said biodegradable shot wad comprises a biodegradable material. In some embodiments, said biodegradable powder wad comprises a biodegradable material. In some embodiments, said biodegradable powder wad is physically and chemically distinct from said biodegradable shot wad. In some embodiments, upon firing of said shotgun shell from a shotgun, said biodegradable powder wad stays intact and does not break apart during firing or landing, and said biodegradable shot wad breaks apart into multiple discrete pieces during firing or landing.

In some embodiments, said biodegradable powder wad comprises a biodegradable polymer that satisfies the ASTM D6400 standard (2004). In some embodiments, said biodegradable shot wad comprises a biodegradable polyester. In some embodiments, said biodegradable powder wad comprises a biodegradable polyester. In some embodiments, upon firing of said shotgun shell from a shotgun having a barrel such that said shot exits said barrel at a velocity exceeding 1,000 feet per second, said biodegradable powder wad stays intact and does not break apart within one meter of exit from said barrel. In some embodiments, upon firing of said shotgun shell from a shotgun having a barrel such that said shot exits said barrel at a velocity exceeding 1,000 feet per second, said biodegradable shot wad breaks apart into multiple discrete pieces within one meter of exit from said barrel. In some embodiments, said biodegradable powder wad comprises a biodegradable polymer selected from the group consisting of PHA, PLA, PCL, PBS, PBSA, and PBS(c). In some embodiments, said biodegradable powder wad comprises a biodegradable material selected from the group consisting of wool felt, cork, fiber, and paperboard. In some embodiments, said biodegradable powder wad comprises oxo-biodegradable polyethylene. In some embodiments, said biodegradable shot wad comprises a biodegradable polymer selected from the group consisting of PHA, PLA, PCL, PBS, PBSA, and PBS(c). In some embodiments, said biodegradable shot wad comprises PHA. In some embodiments, said biodegradable shot wad has a specific gravity greater than 1.1. In some embodiments, said biodegradable shot wad is a biodegradable shot pipe wad comprising a generally cylindrical wad that has two open ends. In some embodiments, said biodegradable shot wad is a cup-style wad with one open end and one closed end, wherein said one closed end is positioned adjacent to the powder wad within said shell. In some embodiments, said shell provides superior shot patterning when fired than occurs in an otherwise identical shell wherein the chemical composition of the biodegradable shot wad is the same as the biodegradable powder wad.

In some embodiments, a shotgun shell is provided. The shotgun shell can include a shotgun case having a boundary defining an enclosed space. The shotgun shell can include a gas seal wad. The shotgun shell can include a biodegradable shot pipe wad confined within said enclosed space. In some embodiments, said biodegradable shot pipe wad comprises a generally cylindrical wad which contains shot pellets in the shell and has two open ends. In some embodiments, said biodegradable shot pipe wad comprises a biodegradable polymer.

In some embodiments, said biodegradable shot pipe wad comprises a biodegradable polyester. In some embodiments, said biodegradable shot pipe wad comprises a biodegradable polyester selected from the group consisting of a polyhydroxyalkanoate polymer, a polybutylene succinate polymer, a polybutylene succinate adipate polymer, and a polylactic acid polymer. In some embodiments, said shell is formulated such that upon being fired out of a shotgun, said biodegradable shot pipe wad leaves the shotgun intact and then begins to fragment in the air prior to landing. In some embodiments, said gas seal wad comprises a biodegradable polymer.

In some embodiments, a method of shooting a shotgun shell is provided. The method can include providing a shotgun case having a boundary defining an enclosed space and a biodegradable shot pipe wad confined within said enclosed space. In some embodiments, said biodegradable shot pipe wad is a cylindrical wad with two open ends and is situated around shot pellets. In some embodiments, said biodegradable shot pipe wad comprises a biodegradable polymer. The method can include loading said shotgun case into a shotgun. The method can include firing the shotgun, whereby the biodegradable shot pipe wad is discharged from the barrel of the gun. The method can include exposing said biodegradable shot pipe wad to a terrestrial or aquatic environment, wherein said biodegradable wad biodegrades.

In some embodiments, said biodegradable shot pipe wad comprises a biodegradable polymer having a specific gravity greater than 1.1. In some embodiments, said biodegradable shot pipe wad comprises a biodegradable starch polymer. In some embodiments, said biodegradable shot pipe wad comprises a biodegradable polyester. In some embodiments, said biodegradable shot pipe wad comprises a biodegradable polyester selected from the group consisting of a polyhydroxyalkanoate polymer, a polybutylene succinate polymer, a polybutylene succinate adipate polymer, and a polylactic acid polymer. In some embodiments, said shell is formulated such that upon being fired out of a shotgun, said biodegradable shot pipe wad leaves the shotgun intact and then begins to fragment in the air prior to landing. In some embodiments, said shotgun case having a boundary defining an enclosed space additionally comprises a gas seal wad, wherein said gas seal wad comprises a biodegradable polymer.

In some embodiments, a biodegradable shot pipe wad component comprising a biodegradable polymer is provided. In some embodiments, said biodegradable shot pipe wad component is suitable for use in a shotgun shell. In some embodiments, said biodegradable wad is a shot wad that having a generally cylindrical shape with two open ends. In some embodiments, said biodegradable shot pipe wad has a specific gravity greater than 1.1. In some embodiments, said biodegradable shot pipe wad comprises a biodegradable polymer selected from the group consisting of a starch polymer, a polyhydroxyalkanoate polymer, a polybutylene succinate polymer, a polybutylene succinate co-polymer, and a polylactic acid polymer. In some embodiments, said biodegradable shot pipe wad has longitudinal grooves, wherein said grooves facilitate patterned cracking in a spent wad. In some embodiments, said biodegradable shot pipe wad is produced using an extrusion molding process.

Some biodegradable wads are commercially available; in fact, all wads used to be biodegradable. Until the invention of plastic wads, shotgun wads were made of cardboard, fiber, felt, cork, and other natural products, examples of which are still available commercially. However, plastic wads have price and performance advantages, resulting in their widespread adoption.

Biodegradable plastic wads have been taught in the prior art but have yet to make a substantial impact commercially. Chiesa (WO2015033081 A1) teaches a biodegradable plastic wad comprising a blend of a polyalkylene succinate, including polybutylene succinate, with a polyhydroxyalkanoate polymer.

Havens et al. (U.S. Pat. No. 9,528,800) teach the use of a polyhydroxyalkanoate wad. Polyhydroxyalkanoate wads have excellent degradability, but tend to be very brittle or, if made more rubbery, can be very difficult to process. Havens teaches a wad comprising polyhydroxyalkanoate, and teaches the use of wads that stay intact while within the barrel, but break apart soon after leaving the barrel. Unfortunately, Applicants have discovered, after extensive field testing, that this is an extraordinarily delicate balance when the gas sealing wad and shot wad are made from the same plastic formulation. Weather conditions, storage time, molding conditions, and many other variables can impact the wad performance, making it very inconsistent. Sometimes the wad stays intact well after leaving the barrel, and other wads break apart inside the barrel. Applicants believe that such a wad system as described by Havens can be improved, as described herein.

Shahid et al. (U.S. Pat. No. 5,859,090) teach the use of polycaprolactone shotgun wads. Polycaprolactone wads are problematic, among other reasons, because of the low melt temperature of the polymer. For example, if a polycaprolactone wad was left in a truck cab on a hot sunny day, shape changes in the wad could occur, which could compromise performance and potentially cause a misfire, which can be dangerous.

Hampton et al. (GB 2496180) teach a composite material which includes a major percentage of natural-starch polyester polymer and a minor percentage of powdered chemically-untreated straw. The straw provides uniform solidity to the finished composite material, thereby allowing use of the composite in conventional extruding and injection molding. The straw is essential to the device of Hampton to improve dimensional stability during molding of the material, and prevents or limits shrinkage. Unlike Hampton, the PBSA wads do not rely on straw for structural stability. In some embodiments, the wads do not include solid material such as straw in the material. Rather, in some embodiments, the PBSA itself provides dimensional stability and uniform solidity of the finished composite material.

Shotgun shells often utilize more than one wad in the shell, in particular when heavier loads are used with larger shot. For example, a gas sealing wad (also referred to as a powder wad, or gas seal) is often combined with a shot cup wad. Other common wads include overshot wads, filler wads, and cushion wads. As described above, many biodegradable plastics are brittle, and cannot perform wad functions such as gas sealing or protecting the barrel from shot, as they fragment upon firing.

Accordingly, there remains a need for a high-performance biodegradable shotgun wad. A modification to shotgun wads to mitigate the impact of aquatic, plastic debris would be a viable and effective option provided: 1) the modified shotgun wad has performance characteristics comparable to non-biodegradable plastic wads; 2) the wad degrades reasonably quickly once it is abandoned on land or in an aquatic environment, and, once degraded, is environmentally benign along with any additives; and 3) the wad is not too expensive to be of practical use. Due in part to the lack of a sufficiently viable alternative, government regulators fail to limit the enormous amount of plastic pollution created by sportsmen and sportswomen each year.

BRIEF DESCRIPTION OF THE DRAWINGS

The summary above, and the following detailed description, will be better understood in view of the drawings that depict details of preferred embodiments.

FIG. 4A is a photographic image showing the side and bottom of the gas seal; i.e., the end of the gas seal in direct contact with the powder, while FIG. 4B is a photographic image showing the side and the top end (i.e., the end closest to the shot) of the gas seal.

DETAILED DESCRIPTION

The present disclosure is directed to shotgun shells comprising a biodegradable powder wad and a biodegradable shot wad, wherein the biodegradable shot wad surrounds the shot in the shell. In some embodiments, the biodegradable shot wad comprises a biodegradable polyester. In some embodiments, the biodegradable powder wad physically separates the powder from the shot. In some embodiments, the biodegradable powder wad comprises a biodegradable polymer (including non-plastic polymers) according to the ASTM D6400 standard specification for solid material biodegradation by composting. In the embodiments described herein, the biodegradable powder wad is physically and chemically distinct from the biodegradable shot wad. The biodegradable powder wad and the biodegradable shot wad are separate or independent components. In some embodiments, upon firing of the shotgun shell from a shotgun having a barrel such that the shot exits the barrel at a velocity exceeding 1,000 feet per second, the biodegradable powder wad stays intact and does not break apart within one meter of exit from the barrel, and the biodegradable shot wad breaks apart into multiple discrete pieces within one meter of exit from the barrel.

The present disclosure is also directed to loading environmentally responsible shotshells having a multi-component wad system comprising a biodegradable powder wad that stays intact through the firing process, and a distinct biodegradable shot wad that breaks apart within one meter after being shot out of the barrel.

The present disclosure is also directed to firing environmentally responsible shotshells having a multi-component wad system comprising a biodegradable powder wad that stays intact through the firing process, and a distinct biodegradable shot wad that breaks apart within one meter after being shot out of the barrel.

The term "wad" generally refers to a component of a shotgun shell that is used to separate the shot from the powder, and/or to provide a seal that prevents gas from blowing through the shot rather than propelling the shot out of the shotgun, and/or contain the shotgun shot, and/or to protect the barrel from the shot, and/or provide cushioning, and/or fill space in the shell. Commercial wads often consist of three parts: the powder wad, the cushion, and the shot cup or shot wad. In wad systems, the powder wad, the cushion, and the shot wad may be in separate pieces or can be incorporated into a single component. The wad is stored within a shotgun shell. As used herein, a one-piece wad is a wad that includes both the powder wad and the shot wad. The wad system described herein includes a shot wad and a powder wad which are separate or distinct components. The wad system can be referred to as a two-piece wad, although additional components may be within the shotgun shell.

Figure 1:
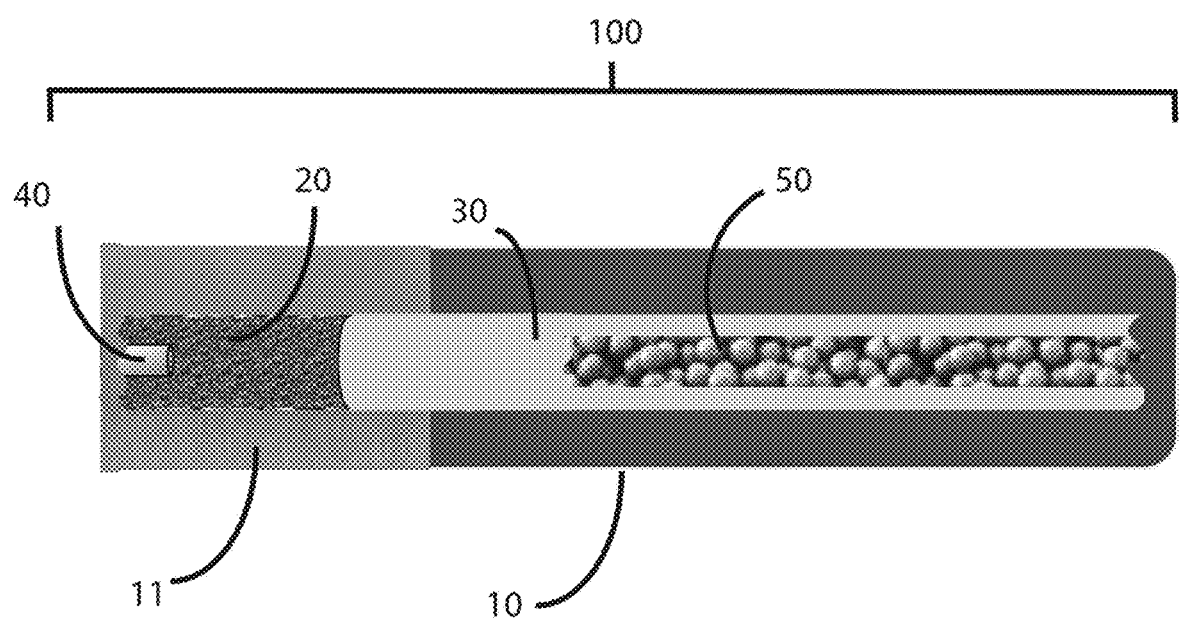
FIG. 1 shows a cutaway perspective view of a shotgun shell.

As shown in FIG. 1, which is a schematic diagram showing components of a shotgun shell 100, the casing 10, here shown to include a brass head 11, contains a powder charge 20 adjacent to a wad system 30. Upon firing, the primer 40 ignites the powder charge 20, which propels the wad system 30 and shot 50 through the barrel of the shotgun. The wad system holds the shot together as it moves down the barrel after firing of the gun. Both the shot and the wad system tend to travel significant distances after leaving the barrel and are often abandoned by the shooter.

The term "wad" includes, but is not limited to, powder wads, over shot wads, cushion wads, and shot wads (including shot pipe wads and shot cups). The powder wad typically provides the gas sealing function, and such wads are also referred to as over powder wads, or gas seals. The shot wad holds the shot together and protects the barrel from the shot, and vice-versa.

Biodegradable shot wads as described herein are a type of shot wad. In embodiments described herein, the shot wad is not a one-piece wad that performs all of the requisite functions of a shotgun wad. Specifically, an independent powder wad is also provided which provides the gas sealing function. The shot wad contains and surrounds the shot. In some embodiments, the shot wad is a shot cup, with one closed end (the back end) that is positioned adjacent to the powder wad.

Figure 2:
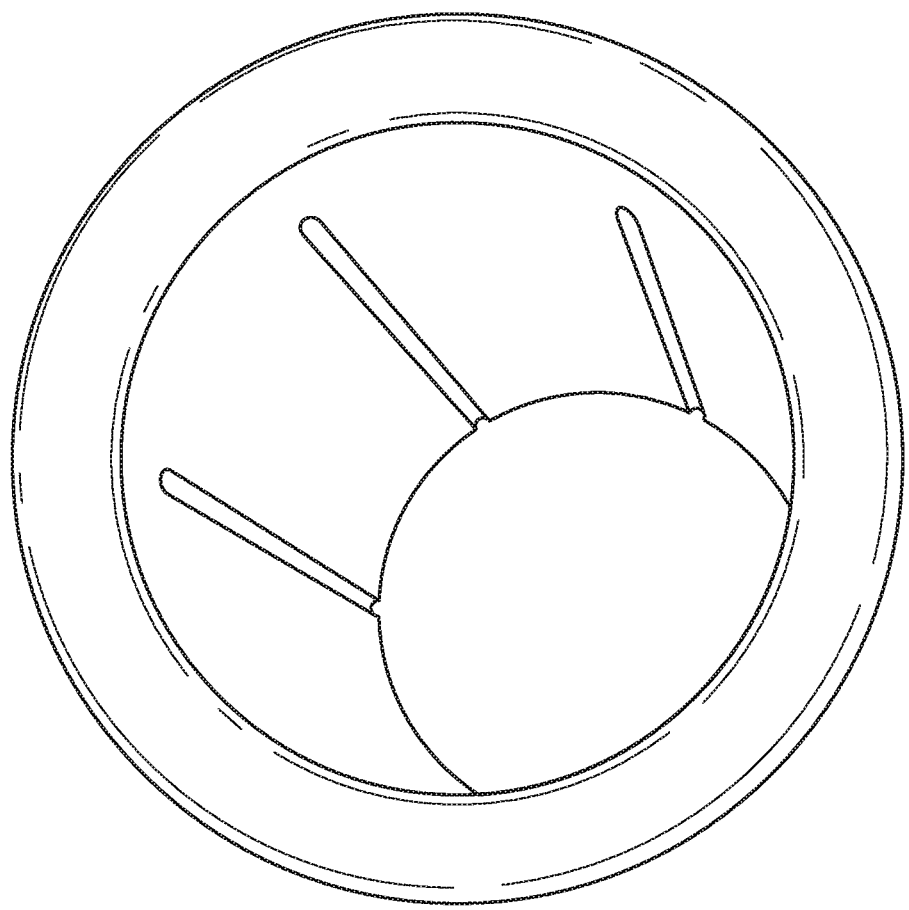
FIG. 2 shows one embodiment of a biodegradable shot pipe shotgun wad which can be combined with an independent shot wad in a shotgun shell.

In other embodiments, the shot wad is a shot pipe wad, which has two open ends. Many sizes, shapes, and designs are contemplated, although the shot pipe wad has the general shape of a cylindrical pipe. A photographic image of one embodiment of a shot pipe wad is shown in FIG. 2. As described herein, a "cylindrical" shape does not require a perfect cylinder; instead, an object having a cylindrical shape includes generally cylindrical objects such as a beer can, a tree trunk, and a pencil. A biodegradable shot pipe wad as described herein can be a perfect cylinder, or it can be tapered, or have a slight barrel shape, or any other suitable variations that have a generally cylindrical shape. For example, the back end of the shot pipe wad (i.e., the end that is closest to the powder and exits the gun last) can be thicker than the front end of the wad (i.e., the end that exits the barrel first), or the front end of the wad (i.e., the end that exits the barrel first) can be thicker than the back end of the shot pipe wad (i.e., the end that is closest to the powder and exits the gun last).

The shot wad can be scored, or cut all the way through in some areas. The shot wad having the shot cup design, the shot pipe wad, or any other shot wad design can include score lines, also called grooves or break lines. In some embodiments, the score lines (do not extend all the way to the back end and/or front end of the shot wad. In some embodiments, the score lines can extend along a portion of the length of the shot wad. The score lines can be longitudinally arranged. The shot wad can include any number of score lines (e.g., one, two, three, four, five, six, seven, eight, nine, ten, etc.). In some embodiments, the score lines can extend the entire length of the shot wad. For example, in one embodiment, in a 12 gauge, biodegradable shot pipe wad having a length of 1.7 inches, six evenly spaced score lines are longitudinally arranged on the inside of the cylinder, extending from one end to the other. In another embodiment, in a 12 gauge biodegradable shot pipe wad having a length of 1.7 inches, eight evenly spaced score lines are longitudinally arranged on the inside of the cylinder, extending a length of 1.6 inches, but stopping 0.05 inches from either end of the shot pipe wad.

Figure 3:
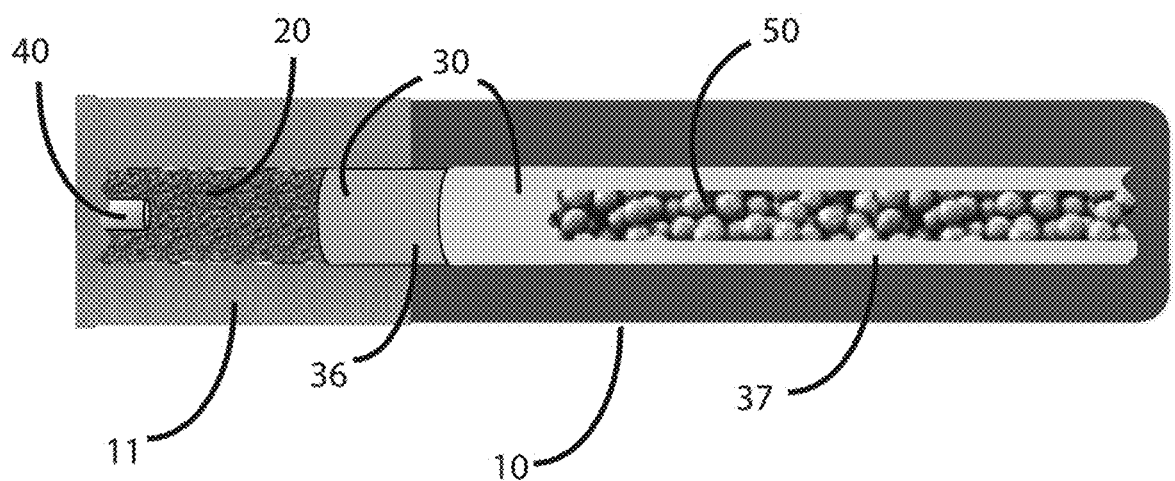
FIG. 3 shows a cutaway perspective view of one embodiment of a shotgun shell loaded with a multi-component wad system comprising a first wad that is a gas sealing wad and a second wad that is a shot cup wad.

FIG. 3 is a schematic cutaway diagram showing a shotgun shell with a multi-component wad system as described herein. The casing 10 (cutaway in the diagram to reveal the contents inside the casing) contains a powder charge 20 beneath a multi-component wad system 30. Upon firing, the primer 40 ignites the powder charge 20, which propels the wad system 30 and shot 50 through the barrel of the shotgun. The wad system 30 includes both a powder wad 36 and a shot wad 37 (also cutaway to reveal the shot inside the shot wad). In this representative embodiment, the casing 10 includes a brass base 11. The wad system holds the shot together as it moves down the barrel after firing of the gun. Both the shot and the wad system tend to travel significant distances and are often abandoned by the shooter.

Figure 4A:
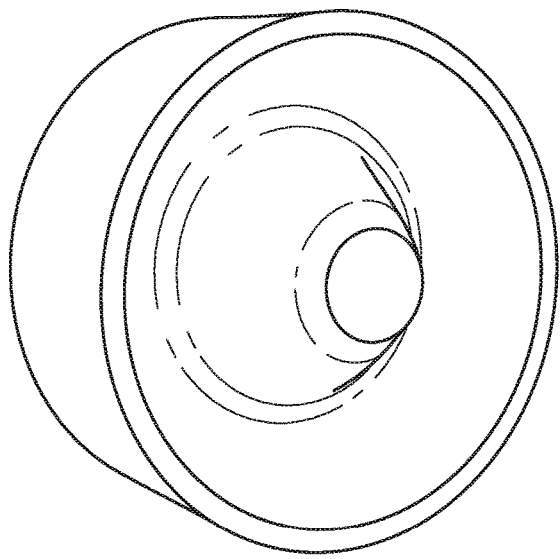
FIGS. 4A and 4B show a photographic image of one embodiment of a PBSA gas seal wad.
Figure 4B:
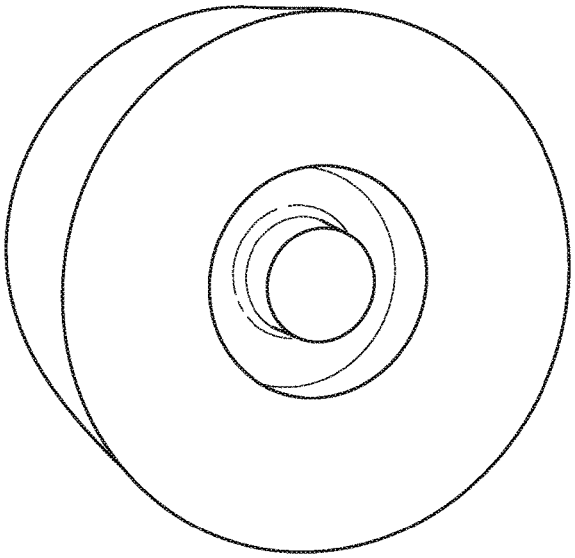

FIG. 4A and FIG. 4B show photographic images of one embodiment of a powder wad suitable as the powder wad in the multi-component wad system described herein. The side of the wad shown in FIG. 4A constitutes the bottom of this gas seal wad, and this side would be adjacent to the powder. The side of the wad shown in FIG. 4B constitutes the top of the this gas seal wad comprising PBSA, and the shot would be loaded on top of this side of the wad after insertion of a shot wad.

In some embodiments, the powder wad comprises a disc or another flat or thin or round object. In some embodiments, the powder wad comprises a side wall or another retainer or perimeter or barrier. In some embodiments, the powder wad comprises an enclosed or partially enclosed shape. In some embodiments, the powder wad is any shape to perform the function of obturating, blocking, or obstructing. Any other wad designs that provide a gas sealing function are contemplated herein, including gas seal designs known in the art.

The powder wad can comprise one or more biodegradable polymers. For example, the powder wad can be a traditional fiber wad, or felt wad, or cork wad, or nitro wad, or some combination thereof. The powder wads can be made from one or more materials that perform the function of separating the shot from the powder. A wide variety of designs are suitable. For example, a fiber wad can be combined with a felt wad. Whichever one is directly in contact with the powder would be referred to herein as the powder wad. In all embodiments described herein, a powder wad is combined with a shot wad that contains and surrounds the shot within the hull. Accordingly, a conventional disc-shaped wad made from a material such as, for example, felt, cork, fiber or plastic, does not constitute a shot wad, irrespective of where it is loaded within the shell, because it would not contain and surround the shot within the hull. Such wads would not protect the gun barrel from being scratched by the shot when the gun is fired, as the disc-shaped wads do not form a radial barrier between the shot and the casing. Various materials are contemplated for the shot wad and/or the powder wad as described herein.

Polyhydroxyalkanoates (PHA) are biological polyesters synthesized by a broad range of natural and genetically engineered bacteria as well as genetically engineered plant crops. In general, a PHA is formed by polymerization of one or more monomer units inside a living cell. Over 100 different types of monomers have been incorporated into PHA polymers (Steinbuchel and Valentin, 1995, FEMS Microbiol. Lett. 128:219-228). Examples of monomer units incorporated in PHAs include 2-hydroxybutyrate, lactic acid, glycolic acid, 3-hydroxybutyrate (hereinafter referred to as 3HB), 3-hydroxypropionate (hereinafter referred to as 3HP), 3-hydroxyvalerate (hereinafter referred to as 3HV), 3-hydroxyhexanoate (hereinafter referred to as 3HH), 3-hydroxyheptanoate (hereinafter referred to as 3HHep), 3-hydroxyoctanoate (hereinafter referred to as 3HO), 3-hydroxynonanoate (hereinafter referred to as 3HN), 3-hydroxydecanoate (hereinafter referred to as 3HD), 3-hydroxydodecanoate (hereinafter referred to as 3HDd), 4-hydroxybutyrate (hereinafter referred to as 4HB), 4-hydroxyvalerate (hereinafter referred to as 4HV), 5-hydroxyvalerate (hereinafter referred to as 5HV), and 6-hydroxyhexanoate (hereinafter referred to as 6HH). 3-hydroxyacid monomers incorporated into PHAs are the (D) or (R) 3-hydroxyacid isomer with the exception of 3HP which does not have a chiral center.

In some embodiments, the PHA in the methods described herein is a homopolymer (where all monomer units are the same). Examples of PHA homopolymers include poly 3-hydroxyalkanoates (e.g., poly 3-hydroxypropionate (hereinafter referred to as P3HP), poly 3-hydroxybutyrate (hereinafter referred to as PHB) and poly 3-hydroxyvalerate), poly 4-hydroxyalkanoates (e.g., poly 4-hydroxybutyrate (hereinafter referred to as P4HB), or poly 4-hydroxyvalerate (hereinafter referred to as P4HV)) and poly 5-hydroxyalkanoates (e.g., poly 5-hydroxyvalerate (hereinafter referred to as P5HV)).

In certain embodiments, the starting PHA can be a copolymer (containing two or more different monomer units) in which the different monomers are randomly distributed in the polymer chain. Examples of PHA copolymers include poly 3-hydroxybutyrate-co-3-hydroxypropionate (hereinafter referred to as PHB3HP), poly 3-hydroxybutyrate-co-4-hydroxybutyrate (hereinafter referred to as PHB4HB), poly 3-hydroxybutyrate-co-4-hydroxyvalerate (hereinafter referred to as PHB4HV), poly 3-hydroxybutyrate-co-3-hydroxyvalerate (hereinafter referred to as PHB3HV), poly 3-hydroxybutyrate-co-3-hydroxyhexanoate (hereinafter referred to as PHB3HH) and poly 3-hydroxybutyrate-co-5-hydroxyvalerate (hereinafter referred to as PHB5HV). By selecting the monomer types and controlling the ratios of the monomer units in a given PHA copolymer, a range of material properties can be achieved.

In some embodiments, mixtures of different PHA polymers can be used. In some embodiments, amorphous PHA is combined with another PHA polymer.

PBS(x) refers to the polybutylene succinate family of polymers, which includes polybutylene succinate and polybutylene succinate copolymers that can be synthesized via condensation of succinic acid, 1,4-butanediol, and one or more additional diacids. For example, adipic acid is the diacid co-monomer that is added to produce PBSA, which is also referred to as poly(butylene succinate-co-adipate) or polybutylene succinate adipate. As contemplated herein, the content of the succinic acid co-monomer in PBS(x) can be between 60% and 100%. This concentration would be 100% when the polymer is PBS (i.e., when there is no co-monomer component), and the concentration of the succinic acid co-monomer can be as low as 60% for copolymers such as PBSA. As described herein, PBS(c) refers to polybutylene succinate copolymers containing a diacid co-monomer other than adipic acid.

For PBSA formulations, mechanical strength initially rises with increased adipic acid monomer content at very low levels of adipic acid monomer (e.g., 5% molar levels or less), but then begins to decrease as adipic acid molar levels increase. As the adipic acid monomer content increases, the glass transition temperature and melt temperature tend to drop. Moreover, biodegradability increases as the adipic acid monomer concentration rises (at least through 20% adipic acid monomer content). In general, PBSA has superior biodegradability to PBS.

The shot wad comprises at least one biodegradable polymer. Suitable biodegradable polymers include polyesters including but not limited to PHA, PBS, PLA, PCL, and PBSA. Thermoplastic starches can be used. Other biodegradable polymers, including ones not yet available commercially, could also be used. Blends of materials can be suitable. The biodegradable polymer PCL has a lower-than-desired melting point and is naturally very tough, and would not be a suitable polymer by itself to use to make the shot wad. However, in blends with PHA, for example, it can be suitable.

Compositions comprising PHA or PHA blends are particularly suitable for the shot wad because of the biodegradability of PHA, provided the impact resistance is appropriate; that is, the impact resistance must be sufficiently high such that the shot wad does not break apart before the shot wad has exited the barrel, but not so high that the shot wad fails to break apart within one meter of leaving the barrel after being fired. Temperature and storage time may have an impact on these properties. In preferred embodiments, the biodegradable polymer of the shot wad is a biodegradable polyester polymer.

The powder wad comprises at least one biodegradable polymer. Suitable biodegradable polymers include polyesters including but not limited to PHA, PBS, PLA, PCL, and PBSA. Compositions comprising PBS(x) blends can be particularly suitable for the powder wad because of the impact resistance which must be sufficiently high such that the powder wad stays intact while exiting the barrel and during flight. Temperature and storage time may have an impact on these properties. Compositions comprising a minor percentage of PHA or PHA blends can be particularly suitable for the powder wad because of the biodegradability of PHA. In preferred embodiments, the biodegradable polymer of the powder wad is a biodegradable polyester polymer.

There are a number of standard tests that measure toughness or impact resistance, but none of them translate perfectly to this application related to biodegradable wads.

Instead, we have designed a functional test most suitable for the intended application; i.e., firing live shotgun ammunition. A 12 gauge, 3", primed hull is loaded with a suitable powder (e.g., 2.2 grams of STEEL® shotshell powder from Alliant Powder), a suitably sized biodegradable powder wad, 1¼ ounces of #2 steel shot, and a suitably sized biodegradable shot wad. The shell is cooled to between −20° C. and 4° C. and fired with a 12 gauge shotgun equipped with an internal modified or modified choke at an initial shot velocity (after leaving the barrel) between 1250 feet per second (fps) and 1500 fps. If the shot wad breaks apart before exiting the barrel, then the shot wad formulation is too brittle. If the biodegradable powder wad does not stay intact, it is not suitable. Another equivalent shell is maintained at a temperature between 20° C. and 25° C. and fired with the same equipment. If the shot wad does not break apart (after firing in a horizontal direction) within one meter of exiting the barrel, then the wad formulation is too tough, and not suitable. For example, many biodegradable shot wad formulations with the rubbery polymer polycaprolactone would be too tough.

Figure 5:
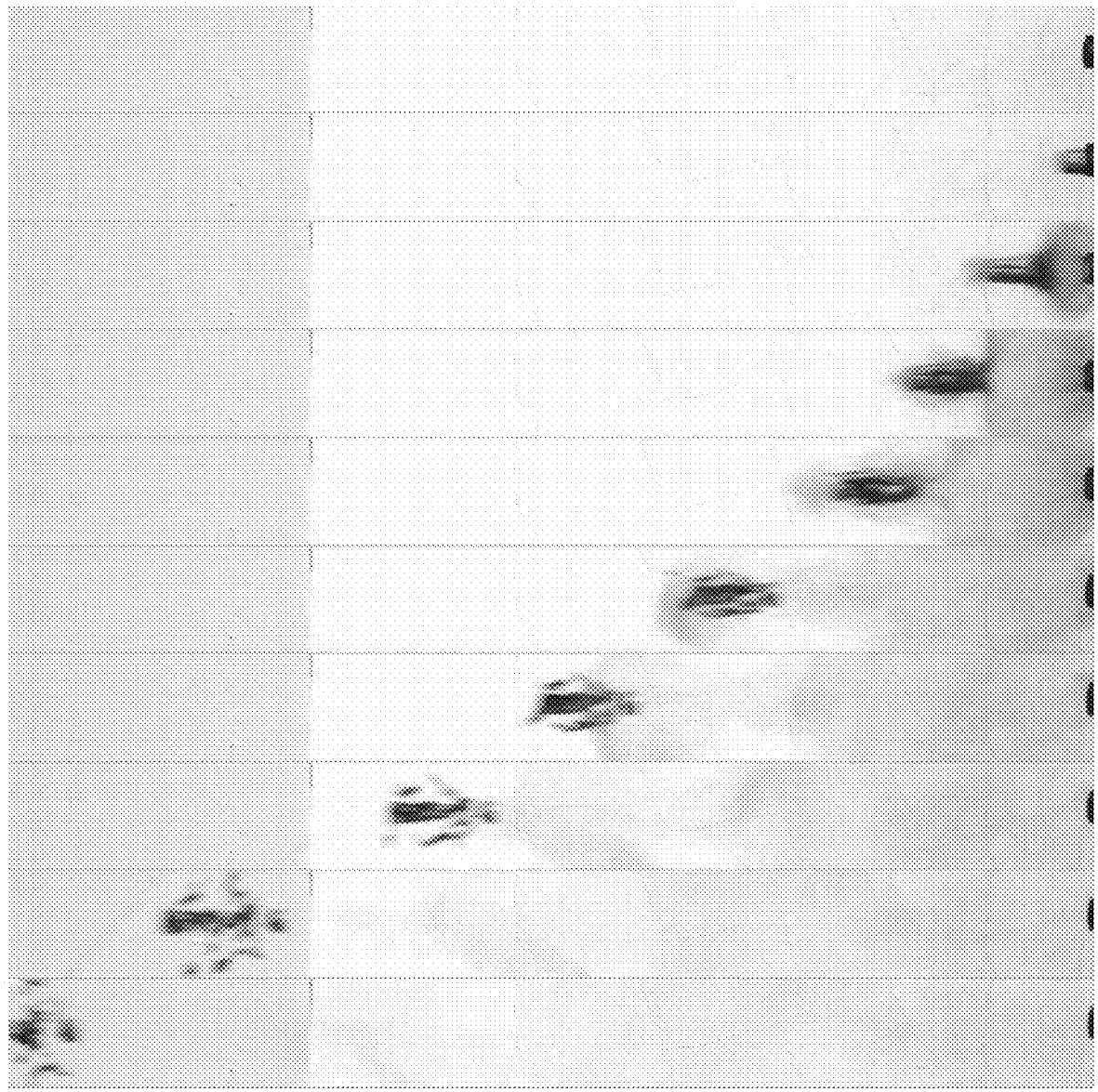
FIG. 5 shows a time series of photographic images taken with an Edgertronic high-speed camera at roughly 30,000 frames per second, showing images of a shotgun firing a shell loaded with a multi-component wad system including a gas sealing wad comprising PBSA. The series of images shows the shot and wads leaving the shotgun barrel just after the weapon is fired.
Figure 6:
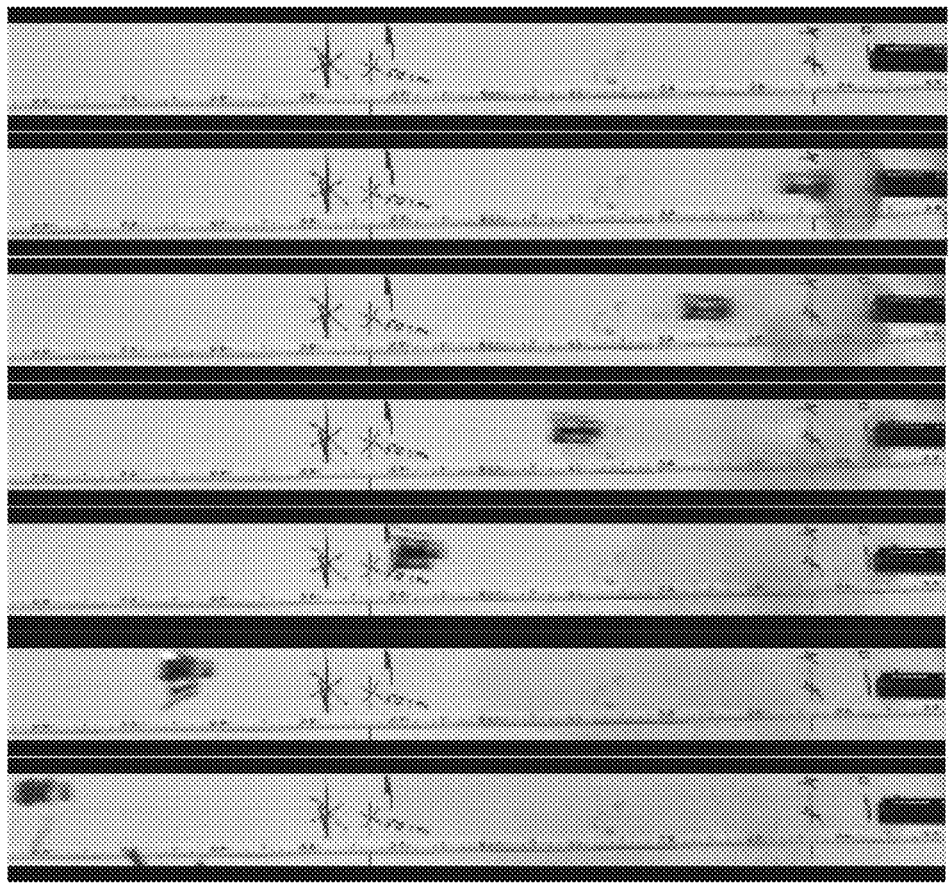
FIG. 6 shows a time series of photographic images taken with an Edgertronic high-speed camera at roughly 30,000 frames per second, showing images of a shotgun firing a shell loaded with a multi-component wad system including a gas sealing wad comprising PBSA. The series of images shows the shot and wads leaving the shotgun barrel just after the weapon is fired.
Figure 7:
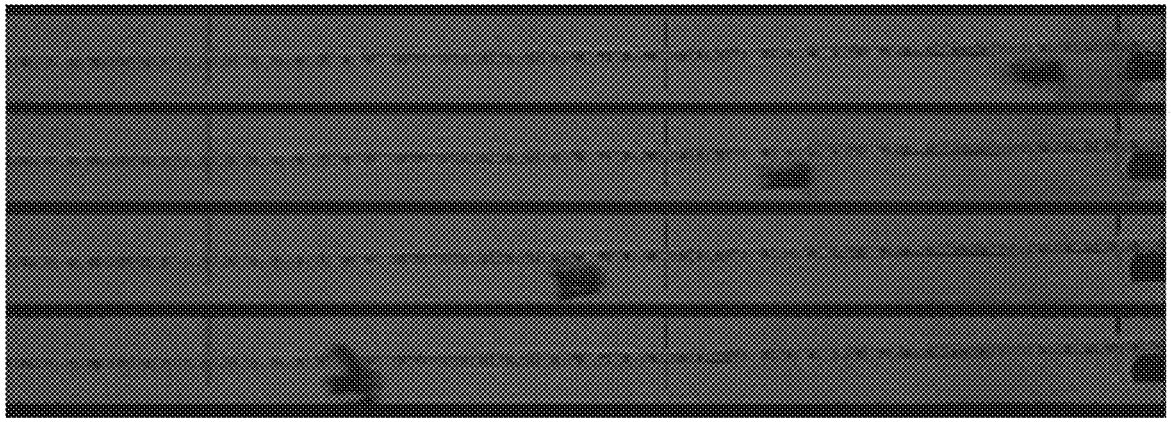
FIG. 7 shows a time series of photographic images taken with an Edgertronic high-speed camera at roughly 30,000 frames per second, showing images of a shotgun firing a shell loaded with a multi-component wad system including a natural fiber powder wad. The series of images shows the shot and wads leaving the shotgun barrel just after the weapon is fired.

FIGS. 5-7 show time-series images of different embodiments of shotshells of the present invention after being fired from a shotgun (taken with an Edgertronic camera at 30,000 frames per second). Depending on a number of variables (including wad design, wad formulation, outside temperature, and loading variables), the biodegradable shot wad can break apart almost immediately upon leaving the barrel, or after traveling up to one meter out of the barrel.

Figure 8:
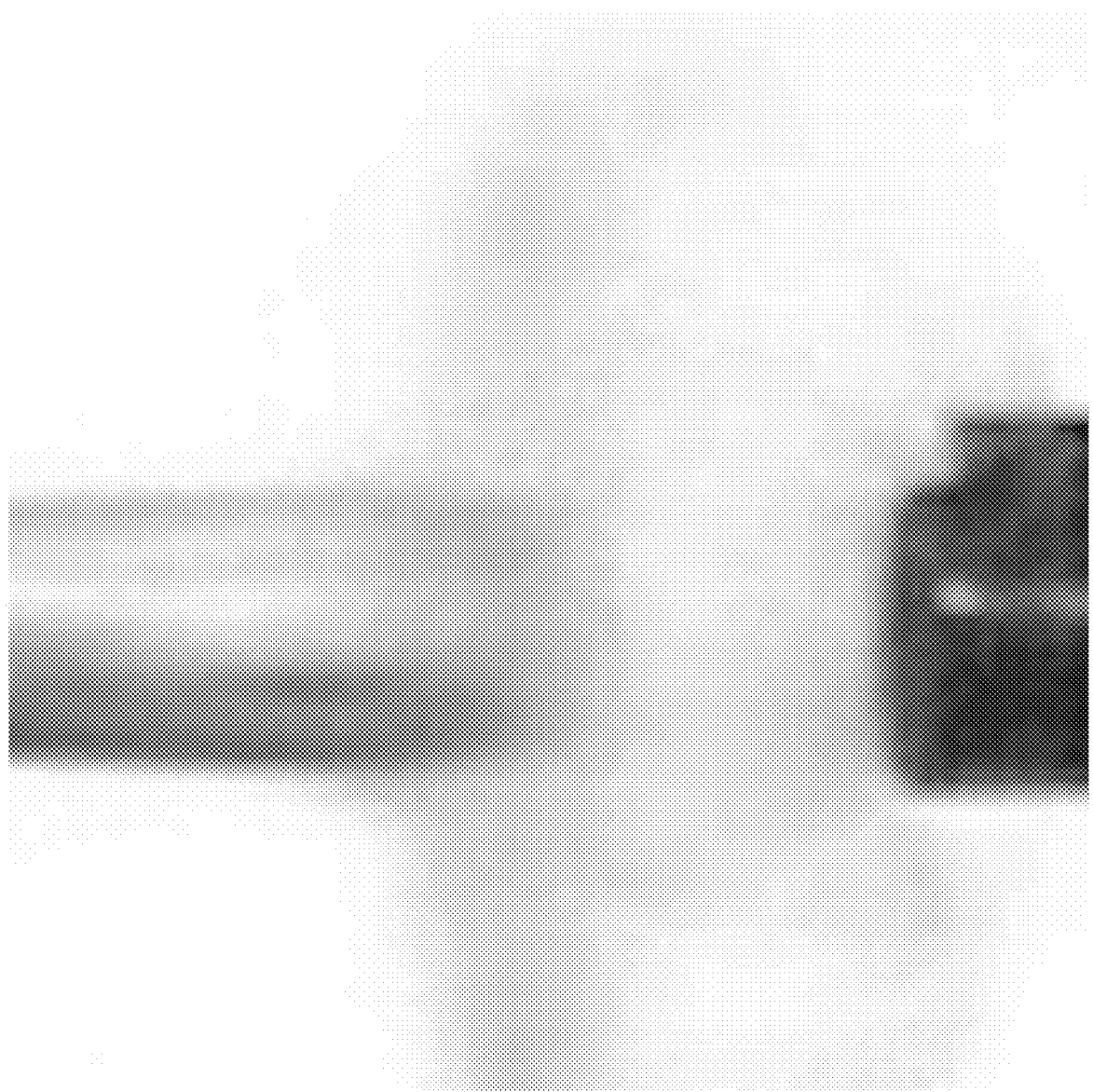
FIG. 8 is a photographic image taken with an Edgertronic high-speed camera at 30,000 frames per second showing a shot wad emerging intact from the barrel.
Figure 9:
FIG. 9 is a photographic image taken with an Edgertronic high-speed camera at 30,000 frames per second showing a shot wad that emerged intact from the barrel, albeit with a clear split that increased in size as the wad's distance from the barrel increased.
Figure 10:
FIG. 10 is a photographic image taken with an Edgertronic high-speed camera at 30,000 frames per second showing a shot wad emerging intact from the barrel, albeit with multiple hairline splits apparent in the shot wad.

FIGS. 8-10 show single images of different embodiments of shotshells of the present invention after being fired from a shotgun (taken with an Edgertronic camera at 30,000 frames per second). Depending on a number of variables (including wad design, wad formulation, outside temperature, and loading variables), the biodegradable shot wad can break apart almost immediately upon leaving the barrel, or after a delay of up to one meter. Cracks can be readily apparent immediately upon exit from the barrel (e.g., FIG. 9 and FIG. 10), or not obviously apparent (FIG. 8). The cracks can be large (e.g., see FIG. 9), which can lead to a clamshell fairing effect, or there can be many smaller cracks (see FIG. 10), which produces different shot patterns when the wad breaks apart in mid-air. In some embodiments, cracks and/or score lines are an integral part of the powder wad design. In other embodiments, cracking can occur during the loading process. In all embodiments, the powder wad does not break apart until it exits the barrel after firing.

The wad system herein described is compatible with various types of shotgun shells. It is anticipated that the wads will be incorporated into shotgun shells used, for example, for waterfowl hunting, clay target shooting, and other activities. It is envisioned that the wads described herein can be inexpensively substituted for existing wads, thereby providing the desired degradability without having a substantial adverse impact on the cost. The wads described herein are also suitable for hunting larger game (e.g., using buckshot loads), smaller game, home defense, and target shooting (e.g., trap shooting, skeet shooting, and sporting clays), and other purposes for which shotguns are useful.

The biodegradable multi-component wad system can be combined with other shotgun shell loading components in any suitable manner, such other components including other wads as desired (e.g., over shot wad, cushioning wad, filler wad, etc.), any size or suitably shaped hull, primer, powder, shot, buffer, etc. For example, hulls can be for 8 ga, 10 ga, 12 ga, 16 ga, 20 ga, 24 ga, 28 ga, 32 ga, or. 410 bore shotguns, and can be any appropriate length (e.g., including but not limited to 2½ inch, 2¾ inch, 3 inch, 3½ inch) and shape (e.g., straight sides, tapered). Any suitable shot material can be used (including but not limited to lead, steel, tungsten, bismuth, and alloys and combinations thereof), in any suitable size (including but not limited to the range from No. 9 shot all the way to 000 buckshot), in any shape (including but not limited to spherical, rough spherical, and hexagonal), and in any payload.

The biodegradable wads described herein can include additives including but not limited to other polymers (including non-biodegradable polymers), lubricants, release agents, plasticizers, impact modifiers, nucleating agents, colorants, stabilizers, photodegradation agents, fillers, and plasticizers. In all such compositions, the biodegradable polymer content remains above 50% by weight of the wad, preferably above 60% by weight, more preferably above 70% by weight, and sometimes above 80% by weight of the wad.

In some embodiments, the shot wad comprises a biodegradable material. In some embodiments, the shot wad comprises a biodegradable polymer. In some embodiments, the shot wad comprises a biodegradable polyester. In some embodiments, the shot wad comprises PHA. In some embodiments, the shot wad comprises two or more biodegradable polymers (e.g., two biodegradable polymers, three biodegradable polymers, four biodegradable polymers, or five biodegradable polymers). In some embodiments, the shot wad comprises a biodegradable polymer in a percentage by weight greater than 50%, greater than 55%, greater than 60%, greater than 65%, greater than 70%, greater than 75%, greater than 80%, greater than 85%, greater than 90%, greater than 95%, between 40% and 60%, between 50% and 70%, between 60% and 80%, between 70% and 90%, between 80% and 100%, approximately 50%, approximately 55%, approximately 60%, approximately 65%, approximately 70%, approximately 75%, approximately 80%, approximately 85%, approximately 90%, approximately 95%, or approximately 100%, or ranges incorporating any of the foregoing values. In some embodiments, the shot wad comprises biodegradable polymers in a percentage by weight of the total wad greater than 50%, greater than 55%, greater than 60%, greater than 65%, greater than 70%, greater than 75%, greater than 80%, greater than 85%, greater than 90%, greater than 95%, between 40% and 60%, between 50% and 70%, between 60% and 80%, between 70% and 90%, between 80% and 100%, approximately 50%, approximately 55%, approximately 60%, approximately 65%, approximately 70%, approximately 75%, approximately 80%, approximately 85%, approximately 90%, approximately 95%, or approximately 100%, or ranges incorporating any of the foregoing values.

In some embodiments, the powder wad comprises a biodegradable material. In some embodiments, the powder wad comprises a biodegradable polymer. In some embodiments, the powder wad comprises a biodegradable polyester. In some embodiments, the powder wad comprises PBS(x). In some embodiments, the powder wad comprises a nonplastic biodegradable material. In some embodiments, the powder wad comprises two or more biodegradable polymers (e.g., two biodegradable polymers, three biodegradable polymers, four biodegradable polymers, or five biodegradable polymers). In some embodiments, the powder wad comprises a biodegradable polymer in a percentage by weight greater than 50%, greater than 55%, greater than 60%, greater than 65%, greater than 70%, greater than 75%, greater than 80%, greater than 85%, greater than 90%, greater than 95%, between 40% and 60%, between 50% and 70%, between 60% and 80%, between 70% and 90%, between 80% and 100%, approximately 50%, approximately 55%, approximately 60%, approximately 65%, approximately 70%, approximately 75%, approximately 80%, approximately 85%, approximately 90%, approximately 95%, or approximately 100%, or ranges incorporating any of the foregoing values. In some embodiments, the powder wad comprises biodegradable polymers in a percentage by weight of the total wad greater than 50%, greater than 55%, greater than 60%, greater than 65%, greater than 70%, greater than 75%, greater than 80%, greater than 85%, greater than 90%, greater than 95%, between 40% and 60%, between 50% and 70%, between 60% and 80%, between 70% and 90%, between 80% and 100%, approximately 50%, approximately 55%, approximately 60%, approximately 65%, approximately 70%, approximately 75%, approximately 80%, approximately 85%, approximately 90%, approximately 95%, or approximately 100%, or ranges incorporating any of the foregoing values. The present application is related to U.S. patent application Ser. No. 14/303,496, filed Jun. 12, 2014, which claims priority under 35 U.S.C. § 119(e) to U.S. Provisional Patent Application No. 61/835,053, filed Jun. 14, 2013, the disclosure of each application is incorporated by reference herein in its entirety.

In some embodiments, the shot wad and/or the powder wad can comprise a material without a non-degradable reinforcing structure such as fibers. In some embodiments, the shot wad and/or the powder wad can comprise a material without a non-degradable matrix or binder.

Some manufacturers claim that their plastic wads are degradable. However, these wads often consist of non-degradable plastic in a matrix of degradable materials. The degradable materials break down leaving behind small fragments of non-degradable plastic. Non-degradable plastics can break apart over time into smaller and smaller pieces. These microplastics pose substantial risk to the entire aquatic food web.

Microplastic fragments range in size from a few to five hundred micrometers. Due to their abundance, microplastics have become a significant marine debris concern worldwide. Once microplastics enter the aquatic ecosystem, their buoyancy, size, and longevity within the water column lead to ongoing problems. Microplastics can be ingested by both pelagic and benthic organisms. Studies have shown microplastic uptake by marine species including filter-feeders, detritivores, deposit feeders, and planktivores. Microplastics accumulate in the fatty tissue of aquatic species. The fatty tissues become more concentrated with microplastics as organisms mature, posing a significant risk for higher order species. For instance, studies have shown the tropic transfer of microplastics from mussels to the crabs that feed on them (Farrell, P. and K. Nelson. 2013. Trophic level transfer of microplastic: Mytilus edulis (L.) to Carcinus maenas (L.). Environmental Pollution 177: 1-3).

An increasing concern is that microplastics can sorb and concentrate contaminants and pollutants. Therefore, not only are microplastics accumulating in the tissues of organisms, but pollutants are also accumulating. These pollutants are transported throughout the food web to organisms at various trophic levels. Therefore, non-biodegradable shotgun wads ultimately contribute to the destruction of the aquatic ecosystem.

Additionally, many non-biodegradable polymers such as polyethylene float, causing the plastic wad to remain suspended in the water column and potentially travel long distances. In contrast, many commercially available biodegradable polyesters (e.g., PBSA, PBS, PHA, PLA) have specific gravities of 1.2 or higher, giving them a tendency to sink when discharged into an aquatic environment. Preferred compositions of biodegradable shot wads and biodegradable powder wads have specific gravities of at least 1.1 and are negatively buoyant. Negative buoyancy reduces the potential distance that the biodegradable wads can travel when they are in an aquatic environment. Further, the negative buoyancy allows the degradable wad to be continuously submerged, which can increase the rate of degradation for PHA and potentially other polymers.

PHA, PBSA, PLA, PBS, and some PBS(c) polymers eventually break down into benign monomers, oligomers, and byproducts. Many conventional plastics do not degrade into benign monomers and oligomers in terrestrial or aquatic environments.

Note that a spent biodegradable wad may be ejected onto land or water, and could move from one environment to the other. There are many variables that impact when and if a spent shotgun wad will degrade in the environment. The time to degradation is complicated by the variability in different micro-environments around the planet. For example, underwater aquatic environments can have substantial variability in terms of pressure, temperature, salinity, and biodiversity, all of which can impact the rate of degradation. Further, degradation is not always consistent throughout the component. For example, the injection molding process can have an influence. Moderating the rate of degradation of a shotgun wad can be achieved, for example, by altering any of a number of factors, including but not limited to: the molecular weight of the polymer, the choice of or concentration of plasticizer or other additives, a coating on the polymer, surface imperfections, or the design of the biodegradable wad, in particular its thickness.

The biodegradable wads described herein break down in the environment into environmentally benign components, sometimes (depending on the environment) in less than a year, but not always. Ammunition shot from the deck of a cruise ship or aircraft carrier over the deep ocean will result in a spent wad that will sink to the bottom of the ocean, an environment that may be anoxic and might not be conducive for biodegradation (e.g., shipwrecked wooden boats can remain remarkably well-preserved after hundreds of years in such environments). Other environments might also not be particularly favorable for biodegradation, so we cannot unequivocally state a time in which the wads will always biodegrade. We can, however, be confident that under most relevant conditions, the biodegradable shot pipe wads will biodegrade reasonably quickly without negatively impacting the environment.

Among the biodegradable polyesters PHA, PBS, PBSA, PCL, and PLA, the material PHA generally biodegrades the most rapidly in saltwater environments. Some preferred biodegradable wad compositions comprise at least 5% PHA, and include compositions wherein PHA is the only biodegradable polymer. In some embodiments, the powder wad comprises a minor percentage of PHA. In some embodiments, the shot wad comprises a major percentage of PHA. In some embodiments, both the shot wad and the powder wad are primarily composed of PHA, but utilize different formulations of PHA. For example, in some embodiments, the powder wad has a much high proportion, relative to the shot wad, of amorphous PHA, which toughens the resulting material.

In some embodiments, the powder wad comprises PHA in a percentage by weight less than 25%, less than 20%, less than 15%, less than 10%, less than 5%, less than 1%, greater than 0%, greater than 1%, greater than 3%, greater than 5%, greater than 10%, greater than 15%, greater than 20%, greater than 25%, between 0.1% and 5%, between 5% and 10%, between 10% and 15%, between 1% and 20%, between 1% and 30%, approximately 0.1%, approximately 1%, approximately 5%, approximately 10%, approximately 15%, approximately 20%, approximately 25%, or approximately 30%, or ranges incorporating any of the foregoing values In some embodiments, the powder wad consists essentially of a biodegradable polymer other than PHA and PHA. In some embodiments, the weight ratio of a biodegradable polymer other than PHA to PHA in the powder wad is greater than 4:1 (e.g., greater than 5:1, greater than 6:1, greater than 7:1, greater than 8:1, greater than 9:1, greater than 10:1, greater than 11:1, greater than 12:1, greater than 13:1, greater than 14:1, or greater than 15:1, or ranges incorporating any of the foregoing values).

The term "effective amount," as used herein, refers to that amount of PHA that imparts a biodegradation effect on a PBSA component. For example, an effective amount can refer to the amount of PHA that improves a biodegradation by at least 1%, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 100%, or ranges incorporating any of the foregoing values. In some embodiments, an improvement in a biodegradation can be the reduction of days before complete degradation. In some embodiments, an improvement in fracturing of a spent wad is an improvement in degradation.

The biodegradable wads can be produced using any suitable production process known in the art. For example, they can be produced by injection molding, or could be produced via extrusion. In some embodiments, an extrusion process could have significant cost advantages relative to injection molding, particularly for a product that is almost perfectly cylindrical. For example, the wads can be produced by injection molding, low pressure molding, gas-assist molding, structural foam molding, coinjection, reaction-injection molding, blow molding, rotational molding, thermoforming, compressing molding, etc.

Through field testing, it has been discovered that biodegradable shot wads as described herein are sufficiently tough to withstand being discharged from a shotgun when combined with a functional biodegradable powder wad, as further described in the examples below. These shot wads fragmented once outside the barrel, visually fragmenting within one meter from the barrel when viewed with a high-speed camera. These shot wads often broke into longitudinal pieces along score lines and traveled between about 10 yards and 30 yards from the barrel. Typically, the biodegradable powder wads, which stayed intact, traveled significantly further from the barrel. Importantly, the biodegradable shot wads not only provide an environmental benefit, but also provide superior shot patterns to conventional wad designs, as described below. It is not inherent that biodegradable shot wads, including those made from a relatively brittle biodegradable polymer such as PHA, will break apart within one meter of leaving the barrel. Depending on the formulation and design, we produced and recovered many intact PHA shot wads that did not break apart within one meter of leaving the barrel. This is obviously not desirable, as the shot is not cleanly released, and the shot-containing shot wad can tumble in flight, leading to erratic patterns. Accordingly, it is crucial to utilize a method wherein the biodegradable shot wad breaks apart within one meter of leaving the shotgun barrel when fired at an initial exit speed exceeding 1,000 feet per second.

By utilizing a shot wad comprising a biodegradable polymer, for example a biodegradable polyester, including, for example, a biodegradable polyester selected from the group consisting of PHA, PBSA, PBS, PBS(x), PCL, PLA, and blends thereof, the shot wad performs its intended function of protecting the barrel/shot, and also provides enhanced performance while substantially decreasing the environmental footprint of sportsmen. When said shot wad is combined with a biodegradable powder wad that stays intact throughout the firing process, in contrast to the shot wad that breaks apart within one meter of leaving the barrel after firing, the entire system is biodegradable and provides outstanding performance.

Particular advantages of this wad system in a shotgun shell can include, but are not limited to advantages related to the biodegradable powder wad: (i) by staying intact, the powder wad can perform the gas sealing function of gas seals of commercially available ammunition; (ii) by staying intact, the powder wad can perform as well as, and in some cases, better than commercial ammunition; and (iii) by staying intact during flight but fragmenting during degradation, the powder wad can adhere to one or more standards for biodegradable without impacting performance.

In some embodiments, the powder wad has the unexpected advantage of better performance. The powder wad has as good as or better results than commercial ammunition, as described herein. Compared with commercial ammunition that utilizes conventional plastic wads, ammunition that incorporates the wad system described herein often provides more shot on target, including more consistent coverage in the target zone, resulting in a higher kill percentage. Many sportsmen have turned away from "degradable" shotgun shells such as paper wads since these wads do not perform as well as non-degradable plastic wads. However, as disclosed herein, the biodegradable wad system has better results based on pattern analysis software. In an example below, ammunition incorporating the biodegradable wad system described herein has a significantly higher percentage of shot on target compared with commercial ammunition.

In some embodiments, the powder wad has the unexpected advantage, relative to other biodegradable polymers, of staying intact when used as the gas sealing wad. In an example below, the powder wads stayed intact. The powder wad can be recovered intact downrange. This is in contrast to the shot wad which fragmented. The fragments of the shot wad traveled less distance than the powder wad. The shot wad may stay intact until exiting the barrel, but fragmentation occurs very soon thereafter. The powder wad can stay intact for the entire flight duration and landing. The powder wad is designed not to fragment during and immediately after being fired. In some embodiments, the powder wad contains a minor percentage of PHA, and is designed to stay intact during and immediately after being fired. In some embodiments, the powder wad contains a minor percentage of PHA, and is designed to stay intact during the duration of the flight but fragment quickly during degradation.

In some embodiments, the powder wad with a minor percentage of PHA has the unexpected advantage of outperforming wads of only one biodegradable polymer. In an example below, wads with a compounded formula of 9:1 weight ratio of PBSA to PHA outperformed wads in which PBSA was the only biodegradable polymer. In some embodiments, the powder wad with a minor percentage of PHA had the unexpected advantage of greater resistance to cracking. In some embodiments, the powder wad with a minor percentage of PHA had the unexpected advantage of a higher average velocity. In some embodiments, the powder wad with a minor percentage of PHA had the unexpected advantage of better shot patterns.

In some embodiments, the powder wad with a minor percentage of PHA has the unexpected advantage of degrading faster than wads of only one biodegradable polymer. PHA has a specific gravity greater than 1 causing its tendency to sink, which can reduce the likelihood of adsorbing floating organic toxins, reduce the likelihood of migrating long distances (e.g., into the middle of the Pacific Ocean), reduce the likelihood of being consumed by sea birds, and accelerate the rate of biodegradation. The minor percentage of PHA has the unexpected advantage of increasing degradability. The powder wad with minor percentage of PHA has the unexpected advantage of increasing degradability in salt water.

In some embodiments, the powder wad can advantageously perform in a variety of conditions. In an example below, the powder wad can perform at a variety of temperatures. The powder wad can perform at a variety of ambient environments, regardless of humidity or due point. The powder wad can perform in a variety of weather conditions and perform as well as commercial ammunition in rain, sleet, hail, snow, wind, extreme heat, or other conditions. Further, the powder wads are as functional as commercially available wads and are sufficiently durable to withstand being discharged from a shotgun. In some embodiments, the powder wad does not undergo a structural change upon firing, allowing the wads to stay primarily intact within the barrel and during flight. In some embodiments, the powder wad, such as the powder wad with a minor percentage of PHA, then breaks apart into small fragments during degradation, or erodes such that small fragments are removed from the main body of the wad.

In some embodiments, the powder wad has the unexpected advantage of faster degradation. The powder wad can degrade in an aquatic environment. The powder wad can degrade within a short period of time, (e.g., six months, twelve months, eighteen months, or twenty-four months, or ranges incorporating any of the foregoing values). The powder wad can degrade in various salinities. The powder wad can degrade by a percentage weight (e.g., about 2%, about 5%, about 10%, about 15%, about 20%, about 25%, about 30%, about 35%, about 40%, about 45%, about 50%, about 55%, about 60%, between 1% and 5%, between 5% and 10%, between 10% and 15%, between 15% and 20%, between 20% and 25%, between 25% and 30%, between 30% and 35%, between 35% and 40%, between 40% and 45%, between 45% and 50%, between 50% and 55%, between 55% and 60%, greater than 5%, greater that 10%, greater than 15%, greater than 20%, greater than 25%, greater than 30%, greater than 35%, greater than 40%, greater than 45%, greater than 50%, greater than 55%, or greater than 60%, or ranges incorporating any of the foregoing values) with a certain period of time (e.g., 1 month, 2 months, 3 months, 4 months, 5 months, 6 months, 7 months, 8 months, 9 months, 10 months, 11 months, or 12 months, or ranges incorporating any of the foregoing values).

The powder wad can degrade by a percentage weight (e.g., about 25%, about 30%, about 40%, about 50%, about 55%, about 60%, about 70%, about 90%, about 100%, 100%, between 25% and 50%, between 40% and 60%, between 60% and 65%, between 65% and 70%, between 70% and 75%, between 75% and 80%, between 80% and 85%, between 85% and 90%, between 90% and 95%, between 95% and 100%, greater than 50%, greater than 55%, greater than 60%, greater than 65%, greater than 70%, greater than 75%, greater than 80%, greater than 85%, greater than 90%, or greater than 95%, or ranges incorporating any of the foregoing values) with a certain period of time (e.g., 12 month, 13 months, 14 months, 15 months, 16 months, 17 months, 18 months, 19 months, 20 months, 21 months, 22 months, 23 months, 24 months, 25 months, 26 months, 27 months, 28 months, 29 months, 30 months, 31 months, 32 months, 34 months, 35 months, or 36 months, or 37 months, or 38 months, or 39 months, or 40 months, or ranges incorporating any of the foregoing values).

Particular advantages of this wad system in a shotshell can include, but are not limited to, advantages related to the biodegradable shot wad: (i) by breaking apart into multiple pieces, the biodegradable shot wad is less visually unappealing, as it is less obvious to the naked eye; (ii) by breaking apart into multiple pieces, more surface area of the biodegradable shot wad is exposed, which tends to increase the rate of biodegradation; (iii) by breaking apart into multiple pieces, the biodegradable shot wad can be less likely to cause injuries if ingested by an animal; and (iv) by breaking apart into multiple pieces, the biodegradable shot wad provides a cleaner release of the shot than typical prior art plastic wads, all the while the powder wad stays intact and efficiently contains the expanding gases to propel the shot.

In some embodiments, the shot wad can be advantageously produced in a number of wad configurations. The shot wad can be used in combination with various powder wads of different sizes, materials in configurations. The shot wad can be made from PHA and loaded with different powder wads comprising biodegradable plastic or biodegradable non-plastic materials. The quantity of powder and shot can vary, as well as shot sizes. The biodegradable shot wad in combination with a biodegradable powder wad can advantageously produce as good as or better shot patterns as commercial ammunition. The wad systems do not usually produce inferior shot patterns, and in some cases can produce more shot on target, and/or more consistent coverage in the target zone, resulting in a higher kill percentage. In some embodiments, the ammunition using a wad system with a biodegradable non-plastic powder wad has a lower average velocity than otherwise equivalent ammunition (i.e., equivalent shot and powder) using a wad system with a biodegradable plastic powder wad comprising a plastic material.

In some embodiments, the shot wad has the unexpected advantage of faster degradation. The shot wad can degrade in an aquatic environment. The shot wad can degrade within a short period of time, (e.g., six months, twelve months, eighteen months, twenty-four months, etc.). The shot wad can degrade in various salinities. The shot wad can degrade by a percentage weight (e.g., about 5%, about 10%, about 15%, about 20%, about 25%, about 30%, about 35%, about 40%, about 45%, about 50%, about 55%, about 60%, between 1% and 5%, between 5% and 10%, between 10% and 15%, between 15% and 20%, between 20% and 25%, between 25% and 30%, between 30% and 35%, between 35% and 40%, between 40% and 45%, between 45% and 50%, between 50% and 55%, between 55% and 60%, greater than 5%, greater that 10%, greater than 15%, greater than 20%, greater than 25%, greater than 30%, greater than 35%, greater than 40%, greater than 45%, greater than 50%, greater than 55%, greater than 60%, or ranges incorporating any of the foregoing values) within approximately 4 months (e.g., 1 month, 2 months, 3 months, 4 months, 5 months, 6 months, 7 months, 8 months, or ranges incorporating any of the foregoing values)

The shot wad can degrade by a percentage weight (e.g., about 10%, about 15%, about 20%, about 25%, about 30%, about 35%, about 40%, about 45%, about 50%, about 55%, about 60%, about 70%, about 90%, about 100%, 100%, between 1% and 20%, between 20% and 30%, between 50% and 55%, between 55% and 60%, between 60% and 65%, between 65% and 70%, between 70% and 75%, between 75% and 80%, between 80% and 85%, between 85% and 90%, between 90% and 95%, between 95% and 100%, greater than 10%, greater than 20%, greater than 30%, greater than 40%, greater than 50%, greater than 55%, greater than 60%, greater than 65%, greater than 70%, greater than 75%, greater than 80%, greater than 85%, greater than 90%, or greater than 95%, or ranges incorporating any of the foregoing values) within approximately 12 months (e.g., 8 months, 9 months, 10 months, 11 months, 12 month, 13 months, 14 months, 15 months, or 16 months, or ranges incorporating any of the foregoing values).

There are additional unexpected advantages for the multi-component wad system described herein relative to a one-piece, unitary wad system. A one-piece wad system is substantially cheaper, with potentially reduced costs for loading (at least one fewer component than a two-piece wad system) and reduced costs to produce the wads (injection molding is typically priced on a per piece basis, so producing two small plastic parts is substantially more expensive than producing one slightly larger part). Yet in spite of the cost disadvantage, the multi-component wad system and methods described herein are advantageous relative to a one-piece wad system that also seeks to take advantage of the clean release afforded by the wad breaking up post-barrel. The problem with a one-piece wad system that breaks up post-barrel is that the formulation can lead to either (i) premature cracking in the gas sealing portion of the one-piece wad, or (ii) failure of the wad to break up after leaving the barrel. In the former case, if the gas sealing portion is compromised, then after firing the shell, the rapidly expanding propulsive gases can blow through the gas sealing wad portion, reducing the efficiency of the shell and compromising performance, which can lead, for example, to wounded waterfowl that do not fall close enough to the hunter to be recovered. In the latter case, if the formulation is too tough and the wad does not break up, then shot accuracy and patterning can be negatively impacted. While it is possible to design and formulate a one-piece wad that performs in the desired manner by breaking apart after leaving the barrel, there is a small margin for error. Variability in the injection molding temperature, or changes in the wad over time, for example, due to slow crystallization of PHA, could easily exceed the small margin for error, yielding poor product and disappointed users. Unfortunately, this single-wad system is not as robust, not as consistent, and is less commercially viable, than the multi-component wad system described herein, in spite of the cost disadvantage associated with the multi-component wad system.

EXAMPLES

Plastic resins can be obtained from numerous suppliers. For example, PBS and PBSA can be obtained from Showa Denko K.K. in Tokyo, Japan); PHA can be obtained from Danimer Scientific in Bainbridge, Ga.; PLA can be obtained from NatureWorks in Minnetonka, Minn.; and PCL can be obtained from Perstorp in Warrington, England. Plastic resins can also be obtained from other suppliers.

Example 1. Formulations of PBSA (BIONOLLE™ 3001 MD, made by Showa Denko K.K. in Tokyo, Japan) were utilized to form powder wads. Primed 3-inch hulls were loaded with powder, a PBSA powder wad, a shot wad using a shot cup design that was injection molded with a PHA formulation (MIREL® P1004, made by Metabolix Inc. in Cambridge, Mass.) and 1¼ ounces of #2 steel shot, then crimped. The shotgun shells were fired from a shotgun at targets to compare shot patterns with commercial ammunition. Performance was as good as or better than comparable commercial ammunition that was tested, including comparable average speed, based on having more shot on target and a higher kill percentage as determined using pattern analysis software (Shotgun Analyzer software available from Target Telemetrics in Martin, Mich.).

Example 2. Formulations of PBSA were utilized to form gas seals for 12 gauge shotguns. The PBSA gas seals, with a length of approximately 8 mm, were loaded into shells with powder, #2 steel shot (1¼ ounces), and a biodegradable shot pipe wad (approximately 44 mm in length having a slightly tapered design with an average wall thickness of approximately 1.4 mm) made from a polyhydroxyalkanoate polymer designed and formulated to fracture after leaving the shotgun barrel upon firing. An exemplary PHA shot pipe wad, with longitudinal score lines to facilitate patterned, post-barrel fracture, is shown in FIG. 2.

Sufficient powder was used to generate an average velocity of 1338 fps, as measured using an Edgertronic high-speed camera.

FIG. 5 shows a time series set of images from one such shot, showing the flash of the gun, the emergence of the shot and wad, and then the fragmentation of the shot pipe wad soon after it leaves the barrel. In contrast to the shot pipe wad, the gas seal wad stays intact. FIG. 5 shows a PHA shot wad breaking into many pieces and a PBSA gas seal intact. FIG. 5 shows early breakup of the PHA shot wad, but the wad is still intact inside barrel and immediately upon exit of the barrel.

FIG. 6 shows a time series set of images from another such shot, showing the flash of the gun, the emergence of the shot and wad, and then the fragmentation of the shot pipe wad after leaving the barrel, in this case, with complete breaking up of the shot pipe wad occurring more than 50 cm downfield. FIG. 6 shows an intact PBSA gas seal and a PHA shot wad that breaks apart downfield.

Shot patterns were compared to a commercial 12 gauge, 1¼ ounce, #2 steel shot load using a test pattern at 40 yards, and fired from a shotgun equipped with an Improved Modified Choke. A significantly higher percentage of shots (88%) hit a 4 ft.×4 ft. target using the biodegradable ammunition described herein relative to the commercially available product, and a significantly higher percentage of shots (56%) fell within a central 30-inch diameter circle (the commercial product percentages were 75% and 41%, respectively). Gas seals stayed intact and were found downrange, while the shot pipe wad broke apart after exiting the barrel, and fragments thereof were found not as far downrange. No significant gas blowthrough was observed with any of the shots.

Example 3. Biodegradable gas pipe wads were made from a PHA formulation and loaded into shells with a series of different powder wads, including wool felt, cork, fiber, nitro cards (obtained from Ballistics Products), beeswax (obtained from one of the inventor's hives), and combinations thereof. The quantity of powder and shot varied as different types of loads were loaded, and shot sizes varied as well. Patterns were excellent, and velocities were acceptable, although on average velocities were nearly 10% lower than when otherwise equivalent loads were shot with a high-quality, obturating, plastic powder wad (e.g., the 12 ga obturator gas seal available from Ballistics Products) rather than the powder wads made from the natural materials described above. FIG. 7 shows a time-series image of one of these loads being fired.

Example 4. Formulations of PBSA (made from BIONOLLE™ 3001 MD, available from Showa Denko K.K. in Tokyo, Japan) were utilized to form gas seals for 12 gauge shotguns. The PBSA gas seals were loaded into shells with powder, #2 steel shot (1⅜ ounces), and a shot pipe wad made from a polyhydroxy alkanoate polymer designed and formulated to fracture after leaving the shotgun barrel upon firing. Sufficient powder was used to generate an average velocity of 1514 fps, with 84% of the shots hitting a 48 inch square target at 40 yards, and 44% within a 30-inch diameter circle.

Example 5. Formulations of PBSA (made from BIONOLLE™ 3001 MD, available from Showa Denko K.K. in Tokyo, Japan) were utilized to form gas seals for 12 gauge shotguns. The PBSA gas seals were loaded into shells with powder, nine to eleven pellets of 00' shot, a shot pipe wad made from a PHA polymer designed and formulated to fracture after leaving the shotgun barrel upon firing, a filler wad, and optionally buffer (to fill in spaces between the shot) and optionally a cushion wad. Not surprisingly, shot patterns improved when using buffer; in this case, a buffer comprising PHA powder. The buffer can include any material including those disclosed herein. In some embodiments, the buffer degrades into environmentally benign components.

Example 6. Shot wads comprising PHA, suitable as part of a multi-component wad system described in other examples and having a shot cup design with one closed end, were injection molded and tested for biodegradability. Groups of three wads were placed in 250 micron mesh bags. The bags were tied shut using cable ties, and a lead weight was attached if the bag was to be submerged. The bags of wads were put in various locations around the Chesapeake Bay watershed in Virginia, and tested after roughly four months to assess biodegradation by weight. To perform the testing, the wads were cleaned, dried in an oven, and weighed. The wads were then re-deployed in the same places for an additional year, then tested again. Note that this process reduces biodegradation relative to wads that are just left in the environment for the entire time, as there is a ramp-up phase for biodegradation and the rinse/clean process necessitates a repeat of the ramp-up phase. The results are provided in Table 1 below. Most of the wads were immersed in water (of various salinities), although some wads were located in tidal areas that were sometimes dry, and one set of wads was placed on seaside riprap that is normally dry (and is a poor environment for biodegradation). The percentage weight losses are the average of each group of three wads at each location.

Figure 11:
FIG. 11 is a photographic image showing fragments of three shot wads that were left together in a 250 micron mesh bag in a saltwater environment for a little over one year.

As is apparent in Table 1 below, the wads biodegraded well in freshwater, brackish, and saltwater environments. An image of the degraded wads (wads from the VIMS Beachside location in the table below after the second test and a total of 16 months in the field over two testing periods) is provided in FIG. 11, which show the increasing frailty and reduction in material along the walls of the cup portion of the wad.

was applied. The loads were then fired from a shotgun equipped with either a full, modified, or improved cylinder choke. The powder wads were designed to be very short in height, thereby taking up a minimum amount of room in the shell to comfortably allow loading of increased amounts of powder and shot. After firing the rounds, the spent powder wads were recovered. In most cases, the wads had been compromised, with slight pinholes or cracks at the weakest point.

Surprisingly, loads with powder wads made from a compounded formulation comprising a 90:10 weight ratio of PBSA to PHA outperformed loads with powder wads made from a formulation in which PBSA was the only biodegradable polymer. In general, the area of cracking was smaller, the average velocity was higher, and a higher average pellet density within a 30-inch circle (40-yard target) was obtained for loads utilizing the powder wads made from a blended mixture of PBSA and PHA. Moreover, these wads from a PHA/PBSA blend may have enhanced degradability, particularly in salt water, relative to otherwise identical wads in which PBSA is the only biodegradable polymer.

Example 8. Primed 3-inch hulls were loaded with powder, a biodegradable powder wad, a biodegradable shot wad, and 1¼ ounces of either #2, #3, #5, or #7 steel shot, then crimped. The loads were then fired from a shotgun equipped with a modified choke.

Example 9. Primed 3-inch hulls were loaded with 2.2 grams powder, a biodegradable
PBSA powder wad, a biodegradable shot wad formulated from PHA, and 1¼ ounces of #2 steel shot, then crimped. The loads were cooled to −16° C., 0° C., or kept at ambient temperature. Shot velocities were averaged over numerous shots, and no significant differences were observed in shot velocities based on shell temperatures. The number of shot pellets hitting within a 30-inch circle at a distance 25 yards from the end of the barrel was recorded. The average percentage of shot hitting within the 30-inch circle was 96% for shells cooled to 16° C. or 0° C., and 98% for shells maintained at ambient temperature (about 30° C.).

TABLE 1

| Location | Submerged? | Salinity (ppt) | % Weight Loss After 4 months | % Weight Loss After 12+ months |
| --- | --- | --- | --- | --- |
| Guthrie Creek | Submerged | | 9 | 86 |
| Lake Matoaka | Submerged | fresh | 21 | 72 |
| Crim Dell | Submerged | fresh | 23 | 59 |
| Cedar Bush | Tidal | 17 | 58 | n/a, bag ripped |
| College Creek | Submerged | 5 | 13 | 80 |
| VIMS Teaching Marsh | Submerged | 5 | 5 | 27 |
| Wachapreague | Submerged | 32 | 13 | |
| VIMS beachside | Submerged | 17 | 16 | 66 |
| VIMS riprap | NOT | n/a | 11 | 12 |
| Seawater fish tank | Submerged | 20 | 44 | 100 |

Additionally, powder wads made from PBSA were fired, recovered, weighed, then deployed in 250 micron mesh bags in many of the same freshwater and saltwater environments. After waiting for one month, the wads were cleaned, dried, and weighed. No significant decomposition was observed. After waiting between 9 and 11 months, the powder wads were cleaned, dried, and weighed. The percentage weight loss at this time ranged from 2% to 6%, depending on the environment. This is consistent with a typically longer incubation period for PBSA than PHA.

Example 7. Primed hulls were loaded with powder, a biodegradable powder wad, a biodegradable shot wad, and 1⅜ ounces of #2 steel shot, then crimped, and then sealant Incorporation by Reference All publications, patents, and patent applications cited herein are hereby expressly incorporated by reference in their entirety and for all purposes to the same extent as if each was so individually denoted.

Equivalents

While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations.

The articles "a" and "an" are used herein to refer to one or to more than one (i.e. to at least one) of the grammatical object of the article. By way of example, "a wad" means one wad or more than one wad.

Any ranges cited herein are inclusive.

What is claimed is:

1. A shotgun shell comprising:
a shotgun hull;
a biodegradable shot wad configured to be confined within said shotgun hull;
a biodegradable powder wad configured to be confined within said shotgun hull;
wherein said biodegradable powder wad is separate and uncoupled from said biodegradable shot wad within said shotgun hull;
wherein said biodegradable shot wad at least partially surrounds shot within said shotgun hull;
wherein said biodegradable powder wad physically separates powder from said shot within said shotgun hull;
wherein said biodegradable shot wad comprises a biodegradable material, wherein the biodegradable shot wad is a relatively brittle shot wad that breaks into multiple fragmented and independent pieces upon exiting the barrel after a shot;
wherein said biodegradable powder wad comprises a biodegradable material, wherein the biodegradable powder wad is less brittle than the biodegradable shot wad, and wherein the biodegradable shot wad is more brittle than the biodegradable powder wad;
wherein upon firing of said shotgun shell, said biodegradable shot wad is configured to fragment into multiple discrete pieces during flight or landing; and
wherein upon firing of said shotgun shell, said biodegradable powder wad is configured to stay intact during flight and landing.

2. The shotgun shell of claim 1, wherein said biodegradable shot wad comprises a biodegradable polymer that satisfies the ASTM D6400 standard (2004).

3. The shotgun shell of claim 1, wherein said biodegradable shot wad comprises a biodegradable polyester.

4. The shotgun shell of claim 1, wherein said biodegradable powder wad comprises a biodegradable polyester.

5. The shotgun shell of claim 1, wherein upon firing of said shotgun shell from a shotgun having a barrel such that said shot exits said barrel at a velocity exceeding 1,000 feet per second, said biodegradable powder wad stays intact and does not break apart within one meter of exit from said barrel.

6. The shotgun shell of claim 1, wherein upon firing of said shotgun shell from a shotgun having a barrel such that said shot exits said barrel at a velocity exceeding 1,000 feet per second, said biodegradable shot wad fragments into multiple discrete pieces within one meter of exit from said barrel.

7. The shotgun shell of claim 1, wherein said biodegradable powder wad comprises a biodegradable polymer selected from the group consisting of PHA, PCL, PBS, PBSA, and PBS(c).

8. The shotgun shell of claim 1, wherein said biodegradable powder wad comprises a biodegradable material selected from the group consisting of wool felt, cork, fiber, and paperboard.

9. The shotgun shell of claim 1, wherein said biodegradable shot wad comprises a biodegradable polymer selected from the group consisting of PHA, PLA, PCL, PBS, and PBSA.

10. The shotgun shell of claim 1, wherein said biodegradable shot wad has a specific gravity greater than 1.1.

11. A method of shooting a shotgun shell comprising:
providing a shotgun shell having a boundary defining a space, a biodegradable shot wad confined within said space, and a biodegradable powder wad confined within said space, wherein said biodegradable shot wad surrounds shot within said space, and wherein said biodegradable powder wad physically separates powder from said shot within said space, wherein said biodegradable powder wad is separate and uncoupled from said biodegradable shot wad within said space;
loading said shotgun shell into a shotgun having a barrel;
firing said shotgun shell from said shotgun, whereby said shot, said biodegradable shot wad, and said biodegradable powder wad are launched out of said barrel;
wherein said biodegradable shot wad comprises a biodegradable material, wherein the biodegradable shot wad is a relatively brittle shot wad that breaks into multiple fragmented and independent pieces upon exiting the barrel after a shot;
wherein said biodegradable powder wad comprises a biodegradable material, wherein the biodegradable powder wad is less brittle than the biodegradable shot wad, and wherein the biodegradable shot wad is more brittle than the biodegradable powder wad;
wherein said biodegradable powder wad is physically and chemically distinct from said biodegradable shot wad; and
wherein upon firing of said shotgun shell from said shotgun such that said shot exits said barrel at a velocity exceeding 1,000 feet per second, said biodegradable shot wad fragments into multiple discrete pieces within one meter of exit from said barrel; and
wherein upon firing of said shotgun shell from said shotgun such that said shot exits said barrel at a velocity exceeding 1,000 feet per second, said biodegradable powder wad stays intact and does not break apart during flight or landing.

12. The method of claim 11, wherein said biodegradable shot wad comprises a biodegradable polymer selected from the group consisting of PHA, PLA, PCL, PBS, and PBSA.

13. The method of claim 11, wherein said biodegradable powder wad comprises a biodegradable material selected from the group consisting of wool felt, cork, fiber, and paperboard.

14. A shotgun shell comprising:
a shotgun hull;
a biodegradable shot wad configured to be confined within said shotgun hull;
a biodegradable powder wad configured to be confined within said shotgun hull;
wherein said biodegradable shot wad at least partially surrounds shot within said shotgun hull;
wherein said biodegradable powder wad physically separates powder from said shot within said shotgun hull, wherein said biodegradable powder wad is separate and uncoupled from said biodegradable shot wad within said shotgun hull;
wherein said biodegradable shot wad comprises a biodegradable material, wherein the biodegradable shot wad is a relatively brittle shot wad that breaks into multiple fragmented and independent pieces upon exiting the barrel after a shot;

wherein said biodegradable powder wad comprises a biodegradable material, wherein the biodegradable powder wad is less brittle than the biodegradable shot wad, and wherein the biodegradable shot wad is more brittle than the biodegradable powder wad;

wherein upon firing of said shotgun shell, said biodegradable shot wad is configured to fragment into multiple discrete pieces during flight or landing; and wherein upon firing of said shotgun shell, said biodegradable powder wad is configured to stay intact during flight and landing.

15. The shotgun shell of claim 14, wherein upon firing of said shotgun shell from a shotgun having a barrel such that said shot exits said barrel at a velocity exceeding 1,000 feet per second, said biodegradable powder wad stays intact and does not break apart within one meter of exit from said barrel.

16. The shotgun shell of claim 14, wherein upon firing of said shotgun shell from a shotgun having a barrel such that said shot exits said barrel at a velocity exceeding 1,000 feet per second, said biodegradable shot wad fragments into multiple discrete pieces within one meter of exit from said barrel.

17. The shotgun shell of claim 14, wherein said biodegradable shot wad comprises a biodegradable polymer selected from the group consisting of PHA, PLA, PCL, PBS, and PBSA.

18. The shotgun shell of claim 14, wherein said biodegradable powder wad comprises a biodegradable material selected from the group consisting of wool felt, cork, fiber, and paperboard.

19. The shotgun shell of claim 14, wherein said biodegradable shot wad comprises a biodegradable polyester.

20. The shotgun shell of claim 14, wherein said biodegradable shot wad has a specific gravity greater than 1.1.

\* \* \* \* \*

UNITED STATES PATENT AND TRADEMARK OFFICE
CERTIFICATE OF CORRECTION

PATENT NO. : 10,480,914 B2
APPLICATION NO. : 16/163867
DATED : November 19, 2019
INVENTOR(S) : Kirk J. Havens Page 1 of 2

It is certified that error appears in the above-identified patent and that said Letters Patent is hereby corrected as shown below:

On the Title Page

Column 2, Item (56), Line 1, under Other Publications, delete "Polyhydroxyalcanoates" and insert --Polyhydroxyalkanoates--.

On Page 2, Column 1, Item (56), Line 7, under U.S. Patent Documents, delete "Clark" and insert --Clark, Jr.--.

On Page 2, Column 2, Item (56), Line 1, under U.S. Patent Documents, delete "Phllips" and insert --Phillips--.

On Page 2, Column 2, Item (56), Line 10, under U.S. Patent Documents, delete "Havens" and insert --Havens et al.--.

On Page 2, Column 2, Item (56), Line 11, under U.S. Patent Documents, delete "Havens" and insert --Havens et al.--.

In the Specification

In Column 12, Line 41, delete "Applicants" and insert --applicants--.

In Column 15, Line 55, delete "(do" and insert --do--.

In Column 16, Line 25, delete "the this" and insert --the--.

In Column 19, Line 42, delete "or. 410" and insert --or .410--.

In Column 27, Line 39, delete "Japan);" and insert --Japan;--.

Signed and Sealed this
Second Day of June, 2020

Andrei Iancu
*Director of the United States Patent and Trademark Office*

CERTIFICATE OF CORRECTION (continued)
U.S. Pat. No. 10,480,914 B2

In the Claims

In Column 31, Line 62, Claim 7, after "PHA," insert --PLA,--.